US010741087B1

(12) United States Patent
Picardi et al.

(10) Patent No.: US 10,741,087 B1
(45) Date of Patent: Aug. 11, 2020

(54) DRONE DIGITAL LOCKER BUILDER

(71) Applicant: Alarm.com Incorporated, Tysons, VA (US)

(72) Inventors: Robert Nathan Picardi, Herndon, VA (US); Matthew Daniel Correnti, Newtown Square, PA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/539,446

(22) Filed: Aug. 13, 2019

Related U.S. Application Data

(60) Provisional application No. 62/718,158, filed on Aug. 13, 2018.

(51) Int. Cl.
*B25J 5/00* (2006.01)
*G05D 1/02* (2020.01)
(Continued)

(52) U.S. Cl.
CPC ......... *G08G 5/0069* (2013.01); *B64C 39/024* (2013.01); *G05D 1/0094* (2013.01);
(Continued)

(58) Field of Classification Search
CPC .. G05D 1/0088; G05D 1/0094; G05D 1/0246; G05D 1/0274; G05D 2201/0209; G05D 1/0022; G05D 1/0044; G05D 1/0212; G05D 1/0219; G05D 1/101; G05D 1/102; G05D 1/12; G05D 2201/0203; G05D 2201/0207; G05D 2201/0213; G05D 2201/0216; G06Q 10/087; G06Q 10/06315; G06Q 10/08; G06Q 30/0202; G06Q 30/0261; G06Q 30/0267; G08B 13/196; G08B 13/19608; G08B 13/19647; G08B 13/2491; Y10S 901/01; Y10S 901/46; B62D 57/032; G05B 19/404; G05B 2219/40543; G05B 2219/45098;
(Continued)

(56) References Cited

U.S. PATENT DOCUMENTS

| 7,249,708 | B2 | 7/2007 | McConnell et al. |
| 8,989,922 | B2 * | 3/2015 | Jones ............. G05D 1/0088 701/3 |

(Continued)

*Primary Examiner* — Jamie J Atala
*Assistant Examiner* — Joon Kwon
(74) *Attorney, Agent, or Firm* — Fish & Richardson P.C.

(57) ABSTRACT

Systems and techniques are described for cataloging objects in a property using a drone. In some implementations, a system monitors a property that includes a drone configured to survey the property. A control unit accesses data identifying items and provides instructions to the drone to locate the items. The control unit receives data identifying a location of a portion of the items, image data associated with each identified items, and data indicating remaining items not located. In response, the data identifying the remaining items and data indicating that the drone did not locate the remaining portion of the items are transmitted to a client device. The control unit receives data indicating a location within the property of a first group of the remaining portion of the items and data indicating that a second group of the remaining portion of the items are not located within the property.

20 Claims, 6 Drawing Sheets

(51) Int. Cl.
*G08B 13/24* (2006.01)
*G05D 1/00* (2006.01)
*G08G 5/00* (2006.01)
*G06K 9/00* (2006.01)
*B64C 39/02* (2006.01)
*G05D 1/10* (2006.01)
*H04N 1/00* (2006.01)

(52) U.S. Cl.
CPC ......... *G05D 1/101* (2013.01); *G06K 9/00771* (2013.01); *H04N 1/00442* (2013.01); *B64C 2201/127* (2013.01); *B64C 2201/146* (2013.01)

(58) Field of Classification Search
CPC ......... G05B 2219/45103; G06K 19/14; G06K 7/10297; G06K 9/00288; G06K 9/00791; G06K 9/00832; H04B 7/18504; H04N 7/181; H04N 7/185
See application file for complete search history.

(56) References Cited

U.S. PATENT DOCUMENTS

| | | | |
|---|---|---|---|
| 9,205,886 B1* | 12/2015 | Hickman | G05D 1/0246 |
| 10,325,272 B2 | 6/2019 | Hunt et al. | |
| 2002/0014356 A1 | 10/2002 | Webb et al. | |
| 2003/0216969 A1* | 11/2003 | Bauer | G06K 7/0008 705/22 |
| 2010/0139576 A1* | 6/2010 | Kim | A01K 15/023 119/721 |
| 2015/0235157 A1* | 8/2015 | Avegliano | G06Q 10/06315 705/7.25 |
| 2017/0090456 A1* | 3/2017 | Mao | G05B 19/404 |
| 2017/0225321 A1* | 8/2017 | Deyle | B25J 19/023 |
| 2019/0005310 A1* | 1/2019 | Kim | G05D 1/0088 |
| 2019/0248002 A1* | 8/2019 | Deyle | B25J 5/007 |
| 2019/0265707 A1* | 8/2019 | Cantrell | B64C 39/024 |
| 2020/0050206 A1* | 2/2020 | Deyle | G01C 21/3453 |

* cited by examiner

300

```
┌─────────────────────────────────────────────────────────────────────┐
│ Generate a template for items commonly found in a monitored property │
│                                                                 302 │
└─────────────────────────────────────────────────────────────────────┘
                                    ↓
┌─────────────────────────────────────────────────────────────────────┐
│ Provide the template and an indication to a drone to perform a      │
│ survey of the monitored property                                    │
│                                                                 304 │
└─────────────────────────────────────────────────────────────────────┘
                                    ↓
┌─────────────────────────────────────────────────────────────────────┐
│ Receive data indicating whether the drone found each item from the  │
│ template in the monitored property                                  │
│                                                                 306 │
└─────────────────────────────────────────────────────────────────────┘
                                    ↓
┌─────────────────────────────────────────────────────────────────────┐
│ In response to determining the drone did not find each item from    │
│ the template in the monitored property, transmit a request to a     │
│ client device of the monitored property requesting a location for   │
│ each missing item from the template                                 │
│                                                                 308 │
└─────────────────────────────────────────────────────────────────────┘
                                    ↓
┌─────────────────────────────────────────────────────────────────────┐
│ Receive the location for each missing item from the template in the │
│ monitored property from the client device                           │
│                                                                 310 │
└─────────────────────────────────────────────────────────────────────┘
                                    ↓
┌─────────────────────────────────────────────────────────────────────┐
│ In response to receiving the location for each missing item,        │
│ transmit the location for each missing item to the drone for the    │
│ drone to find each missing item                                     │
│                                                                 312 │
└─────────────────────────────────────────────────────────────────────┘
```

FIG. 3

DRONE DIGITAL LOCKER BUILDER

CROSS-REFERENCE TO RELATED APPLICATION

This application claims the benefit of U.S. Provisional Application No. 62/718,158, filed Aug. 13, 2018, which is incorporated herein by reference.

TECHNICAL FIELD

This specification relates generally to surveying objects in a property for cataloging using a drone.

BACKGROUND

Many property owners seek to monitor and track the objects found within their residential or commercial property, such as a home or a commercial building. However, for a property owner to catalog the objects found within his or her property, the property owner must manually catalog and track relevant warranty, recall, and maintenance information of the objects, which is a tedious and error prone process.

SUMMARY

The subject matter of the present disclosure is related to cataloging objects in a monitored property using a drone. Cataloging objects in a monitored property, such as residential or commercial properties, to track stock of items, warranties, recalls, and preventative maintenance schedules can help track forgotten items on the monitored property. Automating a cataloging process provides comprehensive coverage of objects in a monitored facility and removes burden on owners to register devices, track relevant warranty, recall, and maintenance information. By removing the burden on owners to manually catalog objects in a monitored property, owners can save time and money and not have to remember the tedious ongoing nature of cataloging objects in their monitored property. Properties that include monitored systems, home automation, and security systems, as described below, may automatically detect some objects through methods such as, energy and water disaggregation. In order for these systems to work, these objects must be connected over a network. Connected objects, in this instance, can contain a wireless radio or consume energy/water. An automated and ongoing cataloging process is required to provide comprehensive coverage of objects in monitored properties.

In one general aspect, a method is performed that includes: accessing, by the monitoring system, data identifying items; providing, by the monitoring system and to a drone that is configured to navigate the property and generate image data, instructions to navigate the property and locate the items; receiving, by the monitoring system and from the drone, (i) data identifying a location of a portion of the items, (ii) first image data associated with each item in the portion of the items, and (iii) data indicating that a remaining portion of the items were not located; in response to receiving the data indicating that a remaining portion of the items were not located, transmitting, by the monitoring system and to a client device of a resident of the property, data identifying the remaining portion of the items and data indicating that the drone did not locate the remaining portion of the items; receiving, by the monitoring system and from the client device of the resident of the property, (i) data indicating a location within the property of a first group of the remaining portion of the items and (ii) data indicating that a second group of the of the remaining portion of the items are not located within the property; transmitting, by the monitoring system and to the drone, the data indicating the location within the property of the first group of the remaining portion of the items; receiving, by the monitoring system and from the drone, second image data associated with each location of each item in the first group of the remaining portion of the items; and storing, by the monitoring system, (i) the data identifying the location of the portion of the items, (ii) the first image data associated with each item in the portion of the items, (iii) the data indicating the location within the property of the first group of the remaining portion of the items, (iv) the second image data associated with each location of each item in the first group of the remaining portion of the items, and (v) the data indicating that a second group of the of the remaining portion of the items are not located within the property.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Implementations may include one or more of the following features. For example, in some implementations, the monitor control unit is configured to: determine a property type of the property; and based on the property type, identify the items, wherein each property type is associated with groups of items that are likely to be located in the respective property type.

In some implementations, the monitor control unit is configured to: provide, to the drone, the instructions to navigate the property and locate the items by providing, to the drone, the instructions to navigate the property, locate the items, and locate additional items that are not included in the items; receive, from the drone, data identifying a location of an additional item and third image data associated with the additional item; and store the identifying a location of an additional item and third image data associated with the additional item.

In some implementations, the drone is configured to: analyze the first image data; based on analyzing the first image data, determine that the first image data includes a representation of a barcode; and determine that the barcode corresponds to an item of the portion of the items.

In some implementations, the drone is configured to: compare the first image data to a plurality of images; and based on comparing the first image data to a plurality of images, determine that the first image data includes a representation of an item of the portion of the items.

In some implementations, the monitor control unit is configured to: based on a layout of the property and characteristics of the items, generate a path for the drone to navigate; and provide, to the drone, the instructions to navigate the property and locate the items by providing, to the drone, the instructions to navigate the property along the path and location the items.

In some implementations, the monitor control unit is configured to: provide, to the drone, (i) additional instructions to navigate the property to locate the portion of the items and (ii) the data identifying the location of the portion of the items; receive, from the drone, data indicating that an item of the portion of items is not in a location of the item; and provide, for output to the client device, an alert indicating that the item is not in the location of the item.

In some implementations, the monitor control unit is configured to: provide, to the drone, (i) additional instructions to navigate the property to locate the portion of the items and (ii) the data identifying the location of the portion of the items, the drone is configured to: determine that an item of the portion of the items is not in a location of the item; determine that the item is in a different location of the property; and provide, to the monitor control unit, data indicating that the item is located in the different location, and the monitor control unit is configured to: store data indicating that the item is located in the different location.

In some implementations, the remaining portion of the items includes only the first group and the second group.

In some implementations, the monitor control unit is configured to: receive data indicating that a new item is located at the property; and in response to receiving the data indicating the new is located at the property, provide, to the drone, instructions to navigate the property and locate the new device.

In some implementations, a sensor that is configured to generate sensor data that reflects an attribute of the property, wherein the drone is configured to: receive the sensor data; analyze the image data and the sensor data; and based on analyzing the image data and the sensor data, determine that the image data includes a representation of an item of the portion of the items.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3-5 are flowcharts of example processes for cataloging objects at a monitored property using a drone.

DETAILED DESCRIPTION

Figure 1:
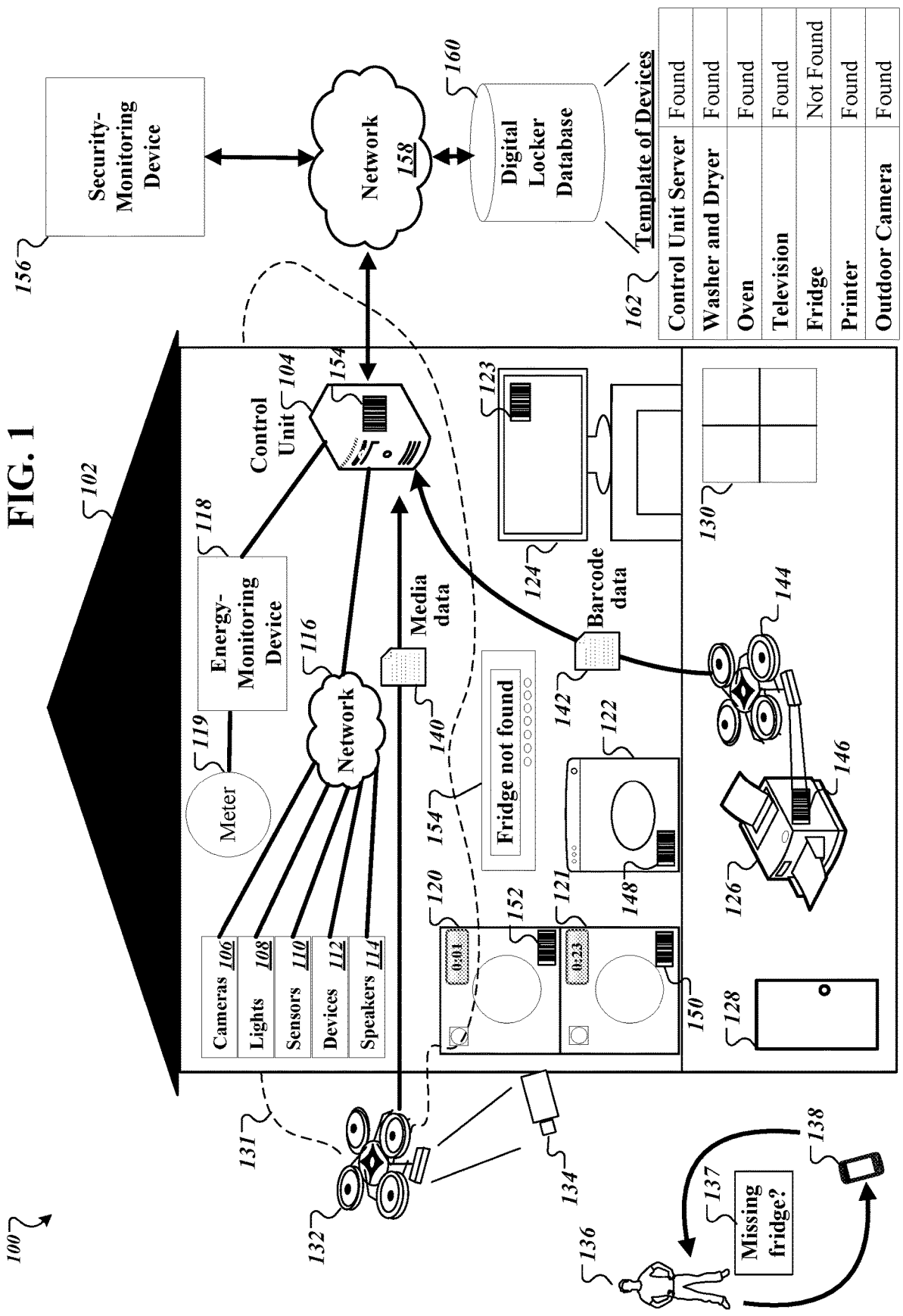
FIG. 1 is a contextual diagram of an example system for cataloging objects in a monitored property using a drone.

In some implementations, a drone periodically surveys the interior and exterior of a monitored property. The drone can catalog objects it finds using automated image analysis. For example, the drone can capture images of barcodes, stickers, or objects themselves in the monitored property. The images can be used to extract information including the make, model, serial number or object category. A control unit server can then use the information to streamline object registration and create a digital locker database of objects for tracking purposes. The digital locker database can be stored within the monitored property or external to the monitored property.

In some implementations, the drone includes onboard intelligence to identify objects of interest and locate barcodes. In other implementations, the drone may collect images/video of the object and provide the media of the object to the control unit server or another external server to perform object identification on the media. In either situation, objects in a monitored property that are connected to the network or unconnected can be catalogued and monitored in a digital locker database. The drones can survey objects in the monitored property in a periodic manner, such as every week, month, or another predetermined timeframe. Alternatively, the drones can survey the objects in the monitored property each time one or more of the sensors detects a moved object in the monitored property. The periodic nature of the surveying allows the digital locker database to stay up to date and can easily account for renovations and replacements in a monitored property.

In one use case, an energy-monitoring device found in a monitored property can detect a change in energy or power consumption. The energy-monitoring device can connect to an electricity meter in a monitored property and provide energy usage statistics of the monitored property. In particular, the energy-monitoring device can provide energy usage statistics to a client device of an owner of the monitored property or a control unit server. The energy-monitoring device can indicate the energy usage of individual appliances found in the monitored property and can recommend personalized improvements for energy efficiencies. The energy-monitoring device can also identify and provide indications to a control unit server of spikes or decreases in energy usage levels that cross a particular threshold. In addition, the energy-monitoring device can recognize new appliances connected to an electrical load at the monitored property by detecting changes in energy or power consumption at the monitored property. In some implementations, the energy-monitoring device can identify the location of the power consumption change down to the location of the breaker.

After the energy-monitoring device detects a new appliance consuming power, the energy-monitoring device sends a notification to the control unit server indicating a new appliance has been connected to the electrical load in the monitored property. The control unit server can dispatch one or more drones to survey the monitored property and identify the new appliance. For example, the new appliance is a newly discovered refrigerator, not found in the digital locker database. However, the refrigerator is already installed in the monitored property, so the drone cannot access the barcode found on the backside of the refrigerator. Instead, the drone captures media of the refrigerator and transmits the media to the control unit server for object identification. The control unit server identifies the refrigerator's make and model and stores the media, the refrigerator's make and model, and any other corresponding information in the digital locker database. In another situation, the control unit server can check whether the refrigerator has a recall using the make, model, and serial number of the refrigerator, without the use of user intervention.

In another use case, an owner returns to the monitored property from a store with a new flat screen television. A front door camera found at the monitored properties identifies a large incoming package (e.g., the new flat screen television) and informs the control unit server at the monitored property of a possible addition to the digital locker database. In particular, the front door cameras notifies the control unit server at the monitored property of the possible addition to the digital locker database. Later that week, after the owner installed the television in his monitored property, the control unit server instructs a drone to perform a survey of the monitored property. The drone detects the new flat screen television and notices that it does not match any television found in the digital locker database. The drone cannot find the barcode on the television to scan and captures media of the television to transmit to the control unit server. The control unit server identifies the make and model of the television and stores this information including a location of the television along with the media in the digital locker database.

FIG. 1 is a contextual diagram of an example system 100 for cataloging objects in a monitored property using a drone. Though system 100 is shown and described with a particular set of components in monitored property 102, such as a control unit server 104, cameras 106, lights 108, sensors 110, home devices 112, speakers 114, network 116, energy-monitoring device 118, drone 132, drone 144, network 158, security-monitoring device 156, and digital locker database 160, the present disclosure need not be so limited. For instance, in some implementations, only a subset of the aforementioned components may be used by the system 100 for cataloging objects in the monitored property. As an example, there may be a system 100 that does not user speakers 114. Similarly, there may be implementations the control unit, such as control unit server 104, is stored in the security-monitoring device 156. In other implementations, the system 100 can include more than two drones. There may be implementations that the security-monitoring device 156 is stored in the control unit server 104. Yet other alternative systems also fall within the scope of the present disclosure such as a system 100 that does not use a control unit server 104. Rather, these systems would communicate directly with the security-monitoring device 156 to perform the monitoring. For these reasons, the system 100 should not be viewed as limiting the present disclosure to any particular set of necessary components.

As shown in FIG. 1, monitored property 102 includes a control unit 104 that utilizes various components to monitor the monitored property 102. The various components within the monitored property 102 may include one or more cameras 106, one or more lights 108, one or more sensors 110, and one or more home devices 112, and one or more speakers 114. The one or more cameras 106 may include video cameras that are located at the exterior of the monitored property 102, as well as video cameras located at the interior of the monitored property 102. For instance, video camera 134 may be located at the exterior of the monitored property 102 facing the backside of the monitored property 102. In another example, another video camera may be located outside the front door 128 of the monitored property 102. In another example, another video camera may be located at the interior of the monitored property 102 near the front door, facing the foyer. The one or more lights 108 may include lights around the monitored property 102 that can be used to light the monitored property 102 and provide notifications to individuals inside the monitored property 102. For example, lights that flash red can indicate a warning to individuals to leave the monitored property 102.

The one or more sensors 110 can include a motion sensor located at the exterior of the monitored property 102, a front door sensor that is a contact sensor positioned at the front door 128, and a lock sensor that is positioned at the front door 128 and each window, such as window 130. The lock sensor can sense whether the front door 128 and window 130 are in an unlocked position or a locked position. The one or more home devices 112 can include home appliances such as a washer 121, a dryer 120, an oven 122, a dishwasher, a stove, a microwave, a television 124, a printer 126, and a laptop, to name a few examples. The security panel 154 may receive one or more messages from a corresponding control unit server 104, a security-monitoring device 156, and an owner's client device 138. The one or more speakers 114 may include speakers around the monitored property 102 that can be used to play sounds at the monitored property 102 and provide auditory notifications to individuals inside the monitored property 102. The one or more speakers 114 can also include one or more microphones.

The control unit server 104 communicates over a short-range wired or wireless connection over network 116 with connected devices such as each of the one or more cameras 106, one or more lights 108, one or more sensors, one or more home devices 112 (e.g., washing machine 121, dryer 120, a dishwasher, an oven 122, a stove, a microwave, a laptop, printer 126, television 124, etc.), one or more speakers 114, drone 132, drone 144, and security panel 154 to receive sensor data descriptive of events detected by each of these devices in the monitored property 102. In some implementations, each of the connected devices may connect via Wi-Fi, Bluetooth, or any other protocol used to communicate over network 116 to the control unit server 104. Additionally, the control unit server 104 communicates over a long-range wired or wireless connection with a security-monitoring device 156 over network 158 via one or more communication links. In some implementations, the security-monitoring device 156 is located remote from the monitored property 102, and manages the monitoring at the monitored property 102, as well as other (and, perhaps, many more) monitoring systems located at different properties that are owned by different individuals. In other implementations, the security-monitoring device 156 communicates bi-directionally with the control unit server 104. Specifically, the security-monitoring device 156 receives sensor data descriptive of events detected by the sensors included in the monitoring system of the monitored property 102 for particular events.

The control unit server 104 can also communicate with a digital locker database 160 over the network 158 via one or more communication links. The digital locker database 160 includes a registration of connected and unconnected objects found in a monitored property 102. The digital locker database 160 can include data for connected and unconnected devices for multiple monitored properties monitored by the security-monitoring device 156. For example, the connected devices include devices that can connect via Wi-Fi, Bluetooth, or any other protocol to the control unit server 104, to the security-monitoring device 156, or client device 138 in the monitored property 102. Unconnected devices can include devices that do not connect to the control unit server 104 or to the security-monitoring device 156. For example, unconnected devices can include one or more chairs, a couch, a non-smart television, interior and exterior portions of a vehicle, kitchen utensils, desks, pictures, and television controllers, to name a few examples.

The digital locker database 160 stores additional data corresponding to each of the connected and unconnected devices for the monitored property 102. For example, the digital locker database 160 stores data corresponding to a name of the device, a barcode of the device, a location of where the device was found in the monitored property 102, media corresponding to the device captured by a camera, any maintenance issues found with the device, the make and model of the device, a corresponding user of the monitored property 102, recall information on the device, and any other data pertinent to the device. The digital locker database 160 creates a registration database of devices found in a monitored property 102.

In some implementations, the digital locker database 160 allows an entity to add or delete data from the digital locker database 160. In particular, a user, such as owner 136, can access the data in the digital locker database 160 with his or her client device 138. The owner 136 can view a web interface, application, or device specific application for a smart home system to view the data in the digital locker database 160. The client device 138 can be, for example, a desktop computer, a laptop computer, a tablet computer, a wearable computer, a cellular phone, a smart phone, a music player, an e-book reader, a navigation system, a security panel, or any other appropriate computing device. In some implementations, the client device 138 can communicate with the control unit server 104 over network 116. The network may be wired or wireless or combination of both and can include the Internet. The client device 138 can also communicate with the security-monitoring device 156 and the digital locker database 160 over the network 158.

In the example shown in FIG. 1, the owner 136 can own the monitored property 102 and can arm the monitored property 102 at any point in time with a signature profile. In doing so, the owner 136 may set a profile to allow the one or more drones found on the monitored property 102 to survey the monitored property for unconnected and connected devices. The owner 138 may interact with the client device 138 to activate a signature profile, such as "surveying" for the monitored property 102. Alternatively, the owner 136 may set another signature profile, such as "survey for new object," for when an owner 136 installs a new device in a monitored property 102 that is required to be registered in the digital locker database 160.

In some implementations, owner 136 may communicate with the client device 138 to activate a signature profile for the monitored property 102. To illustrate, owner 136 may first instruct the control unit server 104 to set a signature profile corresponding with arming the monitored property 102. By arming the monitored property 102, the monitored property 102 is prepared for and can detect any intrusions. Then, the owner 136 can use a voice command to set another profile, such as saying "Smart Home, survey property," to the client device 138. The voice command can include a phrase, such as "Smart Home" to trigger the client device 138 to listen actively to the command following the phrase. Additionally, the phrase "Smart Home" may be a predefined user configured term to communicate with the client device 138. The client device 138 can send the voice command to the control unit server 104 over the network 116 for additional processing. The owner 136 can set a profile without having to arm the property.

In some implementations, the control unit server 104 can notify the security remote device 156 that the monitored property 102 is set to execute the survey signature profile. In addition, the control unit server 104 can set parameters in response to receiving the voice command. Additionally, the control unit server 104 can send back a confirmation to the client device 138 in response to arming the monitored property 102 and setting the associated parameters. For example, the control unit server 104 may transmit a response to the client device 138 that reads "Smart Home, survey profile set."

In some implementations, in order for the control unit server 104 to allow owner 136 and others to set and activate a signature profile case for the monitored property 102, the owner 136 and other may define and store signature profiles in the control unit server 104. In other implementations, the owner 136 and other may define and store signature profiles in the security-monitoring device 156 by instructing client device 138 to store the signature profiles in the security-monitoring device 156. The signature profile may be associated with each property owner and allow for various use cases of the devices in the monitored property 102. Each of the signature profiles can be associated with one user, such as owner 136 or another owner. For example, an owner 136 may create a signature profile for arming the monitored property 102. In another example, the owner 136 can create a signature profile for surveying each of the objects in the monitored property 102 with drones 132 and 144.

In some implementations, owner 136 may store one or more parameters associated with a use case in his or her signature profile. Specifically, the one or more parameters for each use case may describe an aperture amount for the cameras 106, a brightness intensity level and color for the lights 108, a sensitivity amount for each of the sensors 110, whether to turn on or off the selected home devices 112, such as the television 124, laptop, one or more fans in the monitored property 102, setting a specific temperature of a thermometer, opening or closing of the shades of window 130 by a particular amount, alarm settings corresponding to the monitored property 102, camera settings on the drones, flight paths for the drone to take on the interior and exterior of the monitored property 102, a digital map of the monitored property 102 for use by the drones, and any other parameters to describe the use case. For example, the owner 136 can create a signature profile with a use case scenario for "surveying" the objects in the monitored property 102. The owner 136 may define a sensitivity of 4× the normal amount for the one or more sensors 110, an aperture amount of f/8 for the one or more cameras 106, zero lumens and a color of dim white for the one or more lights 108, turning on television 124, turning on a laptop, turning on fans, setting the thermometer to 70 degrees Fahrenheit, opening the blinds halfway of the window 130, turning on the outdoor camera 134, powering on the drones 132 and 144 to survey the monitored property, and turning on notifications for the smart home application on the client device 138 indicating when new devices or objects are found in the monitored property 102.

In some implementations, the control unit server 104 sets the parameters for the desired signature profile when the owner 136 speaks "Smart Home, set survey profile" to the client device 138. The control unit server 104 saves the parameters in memory defined by the owner 136 in the smart home application on the client device 138 in response to the user setting the parameters. In addition, the control unit server 104 may transmit the stored parameters for the signature profile to the security-monitoring device 156 to save for backup purposes.

In some implementations, in response to receiving the indication from the client device 138, the control unit server 104 transmits the stored parameters corresponding to the survey profile to each of the devices. In addition, the control unit server 104 transmits an indication to the security-monitoring device 156 that the survey profile has been set.

Before the control unit server 104 instructs each of the drones at the monitored property 102 to survey the monitored property 102, the control unit server 104 generates a template of commonly found items in the monitored property 102. The control unit server 104 can generate a template based on the type of monitored property. For example, if a monitored property, such as monitored property 102, is a residential home, the control unit server 104 can generate a template of commonly found items that include a control unit server, a washer and dryer, an oven, a refrigerator, a television, a fridge, a printer, a bed, a car, a lawn mower, and a desk, to name a few examples. One such template illustrated in FIG. 1, as template of items 162, specifically for the monitored property 102. In another example, the control unit server 104 recognizes that a monitored property is a commercial property, the control unit server 104 can generate a template of commonly found items that include a control unit server, a printer, a fax machine, one or more computers, office chairs, teleconference system, television, coffee machine, and a key badge scanner, to name a few examples. The control unit server 104 can generate the template based on commonly found items in that type of monitored property. In some implementations, the control unit server 104 can search the Internet for commonly found items based on the type of monitored property. In other implementations, the control unit server 104 can determine the commonly found items by determining the items commonly found in other monitored properties of a similar type.

In some implementations, the control unit server 104 generates the template of commonly found items the first time the drones survey the monitored property 102. In other implementations, the control unit server 104 generates the template of commonly found items each subsequent time an owner 136 instructs the control unit server 104 to survey the monitored property 102. The control unit server 104 transmits the generated template of commonly found items and a notification to power on each of the drones found at a drone-docking station on the monitored property 102 over network 116. The notification can also include instructions for the drone-docking station to power on one or more drones, navigate the monitored property 102, and locate the items found on the generated template of commonly found items. In some implementations, the notification can also include instructions for the drone-docking station to power on one or more devices and locate additional items not found on the generated template of commonly found items.

The drone-docking station includes one or more docked drones, such as drone 132 and drone 144, and one or more antenna for receiving communications from the control unit server 104 and the security-monitoring device 156. The drone docking station can determine the number of drones to launch to survey the monitored property with the received template of items. For example, the drone docking station launches one drone to survey the exterior of the monitored property 102 and another drone to survey the interior of the monitored property.

In some implementations, the control unit server 104 can also transmit a digital map of the corresponding monitored property to each of the drones. The drones, such as drone 132 and 144, can use the digital map of the corresponding monitored property 102 as a guide to survey items in the monitored property 102. For example, drone 132 can use the digital map to follow a path 131 around the monitored property 102. The path 131 allows the drone 132 to fly around all areas of the interior and exterior of the monitored property 102. The areas each include the various floors of the monitored property 102 and the different rooms in the monitored property 102.

In some implementations, the drones fly around the path 131 and scan the monitored property 102 for objects. Each drone includes an attached camera. The drones capture media of each object they encounter as they survey the monitored property 102. The media can include one or more images or one or more videos of the object. For example, as drone 132 flies on path 131 external to the monitored property 102, the drone 132 detects the outdoor camera 134 using its own camera. Each drone, such as drone 132 and drone 144, has onboard intelligence to detect on object. For example, a drone 132 can use one or more object recognition algorithms, machine-learning algorithms, or classification algorithms to detect an object in the monitored property 102. Additionally, the drones can utilize GPS coordinates and other sensor data, e.g., lighting, UV data from UV cameras, and data from proximity sensors, to assist with detecting the object in the monitored property 102.

Upon detecting an object at the monitored property 102, such as detecting the outdoor camera 134, the drone 132 first searches for a barcode on the outdoor camera 134. The barcode of the outdoor camera 134 allows the control unit server 104 to identify specific information of the outdoor camera 134. For example, the specific information can include the make and model of the outdoor camera 134, any recall information associated with the outdoor camera 134, a serial number corresponding to the outdoor camera 134, and other information corresponding to the outdoor camera 134. However, as illustrated in system 100, the outdoor camera 134 does not display a barcode for make and model recognition. As such, the drone 132 cannot find a barcode from the image detection provided by the outdoor camera 134. Instead, the drone 132 captures media of the outdoor camera 134 from various angles. In some implementations, the drone 132 can perform image recognition using the captured media to determine a make and model of the outdoor camera 134.

In other implementations, the drone 132 transmits the captured media data 140 of the outdoor camera 134 to the control unit 104 to perform the image recognition to determine the make and model of a device. In some implementations, the drone 132 or the control unit 104 can use the captured media data 140 to search the Internet or another database to determine the outdoor camera 134's make and model. Once the drone 132 transmits the captured media 140 to the control unit server 104, the drone 132 proceeds down the path 131 to the next object.

In other implementations, the control unit server 104 can include a neural network model or any other type machine-learning model for determining the type and the make and model of the object in the captured media, which can include a barcode. The neural network model may include an input layer, an output layer, and one or more hidden layers. The control unit server 104 can train the neural network model using labeled media data of items. For example, the labeled media data of items can include labeled photographs of televisions, labeled photographs of ovens, labeled photographs of washers and dryers, items for sale online, items for sale in a magazine, and photographs of items in a store, to name a few examples. By labeling media items, the control unit server 104 can indicate photographs, which have the corresponding items found in the label. In addition, the control unit server 104 can retrieve labeled images from other monitored properties to train the neural network model. In particular, the control unit server 104 can retrieve labeled images from the digital locker database 160 for other monitored properties to train the neural network model.

In some implementations, the labels indicate the type of the object found in the image. In other implementations, the labels indicate the make and model of the device found in the image. For example, a labeled image of an oven would include the label "Oven" tagged to the image. In another example, an image of an oven would include the label "SAMSUNG FREESTANDING ELECTRIC RANGE OVEN." The control unit server 104 may use a machine learning technique to continuously train the neural network model as the system 100 continuously receives new devices in the monitored property 102 when applying the model to detect the type or make and model of the object in the image.

The control unit server 104 applies the neural network model when the control unit server 104 receives media from a drone or client device 138. The control unit server 104 provides the media to the trained neural network model to produce an indication of the type of device. In other implementations, the trained neural network model can produce an indication of the make and model of the device from the provided media.

Additionally, when the drone or the control unit server 104 cannot detect a barcode on the detected device, the control unit server 104 can transmit a notification to the client device 138 requesting for the location of the barcode on the detected device over network 116. The owner 136 can respond to the notification with client device 138 with a few responses. In one response, the owner 136 can indicate that the detected device does not have a barcode. In another response, the owner 136 can indicate that the barcode of the detected device is exposed on a particular side. In another response, the owner 136 can take a picture of the barcode on the detected device and transmit the barcode data to the control unit server 104 over the network 116. In another response, the owner 136 can summon the drone to the location of the detected device; expose the barcode on the underside of the detected device, for example, for the drone to capture a picture of the barcode. In response, the drone can transmit the barcode data to the control unit server 104.

If the drones or the control unit server 104 cannot determine a categorization of the object found in the monitored property 102, the control unit server 104 transmits a notification to the client device 138 of the owner 136 requesting the owner 136 to complete the cataloged entry initiated by the drone. For example, the owner 136 can manually enter in the smart home application of the client device 138 the serial number of the object, the make of the object, the model of the object, and capture additional media of the object. In response to the owner 136 completing the cataloged entry, the client device 138 transmits the input information to the control unit server 104 for storage in the digital locker database 160.

The owner 136 may intervene with assisting the drone to capture media or barcode information of the object found in the monitored property 102. For example, if the one or more drones and control unit server 104 cannot identify the device from the captured media, the control unit server 104 can notify the owner 136 through the client device 138 that a particular object, such as a printer 126, is unidentifiable. The owner 136, knowing that the printer 126 has a barcode, can reposition the printer 126 to expose its barcode. In response, the owner 126 can interact with the smart home application on the client device 138 to dispatch one or more drones to survey the monitored property 102 to find the repositioned printer 126. For example, the owner 136 can hit a "Re-Scan" button on the smart home application on the client device 138 for the drones to re-survey the monitored property 102. In some implementations, the owner 136 can dispatch the one or more drones to his or her position to capture a barcode or media of the device. For example, a drone, such as drone 134, can be summoned to the position of the owner 136 by providing the current GPS coordinates of the client device 138 to drone 144. In particular, the owner 136 can speak into the client device 138 and summon the drone 144 to his/her position via a voice command. In this case, the owner 136 dispatches the drone 144 to the repositioned printer 126 and points the drone 144's camera in the direction of the barcode 146. In another example, an owner 136 can flip over a seat in the car where the barcode was located. The owner 136 can capture an image of the barcode with his client device 138 or capture an image of the barcode with drone 144.

In another example, the drone 134 may transmit an indication to the control unit server 104 that the drone 134 needs assistance with capturing an image of the barcode of a particular device. For example, the drone 134 can recognize only half of the barcode, yet needs the entire barcode to identify the object. The control unit server 104 transmits an indication to the client device 138 indicating that the drone 134 needs assistance. For example, the owner 138 can rotate the printer 126 to expose the barcode in its entirety. In another example, the owner 138 can open the door of a refrigerator so the barcode is accessible. The barcode is found to be on the interior of the refrigerator. The drone proceeds to capture the image of the barcode inside the door of the refrigerator.

The drones in system 100 may be able to anticipate access to a barcode for a particular device. In particular, a drone can monitor the owner 136's movement to determine if the owner 136 plans to access a device to expose its barcode. For example, the drone can learn from previous captured media attempts that the barcode of the refrigerator is found on the inside door of the refrigerator. However, when the drone proceeds to capture the barcode of the refrigerator, the drone knows that it cannot capture an image of the barcode from the outside of the refrigerator. In order to capture a door of the refrigerator, the inside door of the refrigerator must be open. The control unit server 104 can receive an indication from an indoor video camera that owner 136 is walking towards the refrigerator. The control unit server 104 can transmit an indication to the drone that indicates the owner 136 will likely open the refrigerator door. The drone can follow the owner to the refrigerator and wait for the opportunity to scan/photograph the barcode after the owner opens the refrigerator door. In other implementations, the drone can learn an owner's movement that indicate when the owner appears to access an area that exposes a barcode for the drone's capture.

In some implementations, system 100 can include one or more drones that survey the exterior of the monitored property 102 and one or more other drones that survey the interior of the monitored property 102. For example, drone 132 surveys the exterior of the monitored property while drone 144 surveys the interior of the monitored property.

The path flown by drone 144 in the interior of the monitored property 102 is based on the dimensions of the monitored property 102's interior. For example, the dimensions of the monitored property 102 includes the number of bed rooms, the number of hallways, the height of the ceiling in each portion of the monitored property 102, the width and length of each room, the number of staircases, the length of each staircase, and the area of the monitored property 102. In some implementations, the control unit server 104 generates the path flown on the interior of the monitored property 102 by requesting for dimensions of the monitored property 102 from the owner 136. Specifically, the control unit server 104 transmits a request for various dimensions of the monitored property 102 to the owner 136's client device 138 and presents a GUI on the smart home application for the owner to enter in the various dimensions of the monitored property 102. In response to receiving the dimensions of the monitored property 102 from the client device 138, the control unit server 104 can generate a path for drones to fly on the interior of the monitored property 102 that allows the drone to survey each wall and space in a room. The control unit server 104's generated path ensures the drones can find each object in the monitored property 102, whether the object is placed on a wall, in the middle of the room, on the floor, or on the ceiling. In other implementations, the drones can build a digital map of the monitored property 102 by surveying each area of the monitored property with photography. Once the drones finish building a digital map of the area, the drones transmit the digital map to the control unit server 104 for storage.

In some implementations, the control unit server 104 can generate a path based on the dimensions of the monitored property 102 and characteristics of items found on the template. The control unit server 104 analyzes the items of the template and determines characteristics associated with each of those items. For example, the control unit server 104 determines the items on the template are kitchen utensils, and consequently, the items on the template would be found in the kitchen. In another example, the control unit server 104 determines the items on the template are living room items, e.g., television, couch, ottoman, and remote control, and as such, the control unit server 104 determines these items would be found in the living room. The control unit server 104 can generate a path based on the type of items found on the template and the location of the items. For example, the control unit server 104 generates a path in the kitchen for the drone to survey for the kitchen items found on the template. The path can also be generated based on the dimensions of the kitchen. The control unit server 104 can generate a path for other locations found in the monitored property 102 and for other characteristics of items found in the monitored property 102. Once the control unit server 104 generates the path, the control unit server 104 transmits the path and the template to the drones at the drone docking station to find the items on the template.

In some implementations, a drone can detect a barcode after detecting an object in the monitored property 102. For example, drone 144 detects a printer 126 in the basement floor of the monitored property 102. The drone 144 captures images of objects during the survey scan and can detect one or more objects in the images. After detecting the printer 126, the drone 144 searches for a barcode in the images where the object was detected. The drone 144 can perform object identification or classification on the images to detect a barcode of the detected object. If the drone 144 cannot find a barcode in the images of the detected object, the drone 144 can move around the detected object and capture images of the detected object from various angles until the barcode is found. For example, as shown in FIG. 1, the drone 144 may detect the printer 126 as being an object when taking an image of the printer 126 from the front side. However, the drone 144 must move to the right side of the printer 126 to capture the image of the barcode 146.

In some implementations, once the drone 144 detects and captures the image of barcode 146, the drone 144 can determine the make and model of printer 126, any recall information associated with the printer 126, a serial number corresponding to the printer 126, and any other information corresponding to the printer 126. In other implementations, the drone 144 transmits the captured barcode data 142 to the control unit server 104 for further processing. The barcode data 142 includes media of the detected printer 126, media of the captured barcode 146 on the detected printer 126, and information identifying the drone 144 to the control unit server 104. The information identifying the drone 144 allows the control unit server 104 to determine which drone captured the barcode information of an object. The control unit server 104 can then determine what the detected object is from the received barcode data 142. The control unit server 104 can use the Internet or another external database to reference the barcode information to identify the detected object.

As drone 144 continues to scan the interior of the monitored property 102, the drone 144 can detect one or more objects. In some implementations, drone 144 can find objects found on the template of items 162 and other objects not found on the template of items 162. For example, drone 144 can detect washer 121 using corresponding barcode 150, dryer 120 using corresponding barcode 152, oven 122 using corresponding barcode 148, television 124 using corresponding barcode 123, and control unit 104 using corresponding barcode 154. In addition, drone 144 can find objects not found on the template of items 162, such as a door 128, a window 130, a chair, a desk, pencil holder, a trashcan, and one or more books, to name a few examples. The drone uses its onboard intelligence to detect the objects it found. In some implementations, the drone can indicate items it found on the template of items 162. For example, the drone recognizes it found the washer 121 and places an indication in the template of items 162 that the washer 121 has been found. The drone can send an updated template of items 162 with one or more of the items marked as found to the control unit server 104 each time a new item is found. The drone can also send an updated template of items 162 to the control unit server 104 after the drone finishes surveying the monitored property 102.

In other implementations, the drone can send data of the detected object to the control unit server 104 and the control unit server 104 determines whether the drone found an object listed on the template of items 162. For example, the data can include the media or the barcode data of the detected object. The control unit server 104 can use the media or the barcode data to identify the detected object and compare the identified object to each item on the template of items 162. The control unit server 104 can indicate on the template of items 162 which item was found. The control unit server 104 will not add items to the template of items 162, but will add the items to the corresponding monitored property table in the digital locker database 160. Each time the control unit server 104 receives the template of items 162 from the drone, the client device, or the monitored property 102's video cameras, the control unit server 104 determines whether the template of items 162 needs to be marked and stores the template of items 162 in the table of the corresponding monitored property in the digital locker database 160. In particular, the digital locker database 160 indexes its tables by a monitored property.

During a drone's initial scan of devices in a monitored property, each time the drone detects a new object and sends either media data or barcode data to the control unit server 104, the control unit server 104 transmits information on the detected device to the digital locker database 160. The digital locker database 160 stores information on the detected device under the corresponding monitored property index. For example, the digital locker database 160 stores a separate database for each monitored property monitored by the security-monitoring device 156. If the security-monitoring device 156 monitors 100 monitoring properties, then the digital locker database 160 will also hold 100 tables, one table for each monitoring property. Therefore, when the control unit server 104 transmits information on the detected device, such as printer 126, to the digital locker database 160, the digital locker database 160 stores information on printer 126 under the table for the corresponding monitored property. For example, each subsequent item the drone 144 or owner 136 using his or her client device 138 detects will be added to the database in the digital locker database 160 for the corresponding monitored property.

Additionally, each database entry in the digital locker database 160 can include a template of items for each monitored property. For example, for the monitored property 102's database entry, the digital locker database 160 includes a database of devices found in the monitored property 102 and a template of devices commonly found in the monitored property 102. As shown in FIG. 1, the template of devices 162 illustrate the devices commonly found in a residential area, such as the monitored property 102. For example, the template of devices 162 illustrate that the commonly found devices in a residential area includes a control unit server, a washer and dryer, an oven, a television, a fridge, a printer, and an outdoor camera. Other devices may be commonly found in a residential area than those shown in template of devices 162, those devices shown in template of devices 162 are shown for illustrative purposes only.

In some implementations, a drone finishes surveying a monitored property once the drone completes traveling the path provided by the control unit 104. In other implementations, the drone finishes surveying a monitored property once the drone has surveyed each room on each floor of the monitored property 102. In response to the drone finishing surveying the monitored property 102, the control unit server 104 can determine the number of items found from the template of items 162. For example, the control unit server 104 can determine from the template of items 162 that the control unit server 104 itself was found; the washer 121 and the dryer 120 were found; the oven 122 was found; the television 124 was found; the printer 126 was found; and, the outdoor camera 134 was found. However, the control unit server 104 can also determine that the refrigerator was not found. In response to determining that the refrigerator was not found, the control unit server 104 can transmit a notification to the client device 138 of the owner 136 indicating that the refrigerator was not found. Additionally, the notification on the client device 138 asks the owner 136 if the refrigerator is missing from the monitored property 102.

In response to receiving the notification on the client device 138, the owner 136 can interact with the smart phone application on his/her client device 138 to indicate a few responses. In one response, the owner 136 can indicate that the monitored property 102 does not have a refrigerator. In another response, the owner 136 can indicate that the drones that surveyed the monitored property 102 missed the refrigerator. The owner 136 can take a picture of the refrigerator with his or her client device 138 and transmit the media data to the control unit server 104. Alternatively, the owner 136 can take a picture of the barcode of the refrigerator with his or her client device 138 and transmit the barcode data to the control unit server 104. In yet another alternative, the owner 136 can take drone 144 to the refrigerator and instruct the drone 144 to snap a picture of the refrigerator or the barcode of the refrigerator. In another response, the owner 136 can provide the location of the refrigerator to the control unit server 104. The GPS coordinates, the definition of a particular room in the monitored property, or a picture of the location in the monitored property 102 where the missing item is located can each indicate the location of the refrigerator.

In another response, the owner 136 can indicate that the refrigerator should be in the kitchen but it appears to have been stolen. The control unit server 104 can receive an indication from the client device 138 that the refrigerator, which was not found, appears to have been stolen. The control unit server 104 can reach out to the local authorities and notify the security-monitoring device 156 that the refrigerator has been stolen. The security-monitoring device 156 can proceed to initiating a survey profile for each of its other monitored properties to ensure no other devices have been stolen.

Using the information provided by the owner 136 of the missing items, the control unit server 104 can transmit the information to drones to survey the monitored property 102 to find the missing items. For example, if the control unit server 104 receives GPS coordinates of the missing item, the control unit server 104 can transmit the GPS coordinates to a drone to move to that location and capture media or barcode data of that device. In another example, if the control unit server 104 receives a picture of the location in the monitored property 102 where the missing item is located, the control unit server 104 can transmit the picture to a drone to survey the monitored property 102 and search for a location that matches the picture.

In some implementations, after the drones have performed an initial survey of the monitored property 102, various devices in the monitored property 102 can be used to detect additional devices added to the monitored property. For example, the monitored property 102 can include an energy-monitoring device 118. The energy-monitoring device 118 can be a device found in the monitored property 102 that is used to provide information on energy or power consumption in the monitored property 102. Specifically, the energy-monitoring device 118 connects to the electricity meter 119 of the monitored property 102 and provide usage statistics of energy consumption to the client device 138 and to the control unit server 104. In some implementations, the energy-monitoring device 118 can indicate the energy usage of individual appliances found in the monitored property 102. The energy-monitoring device 118 can also identify and provide indications to the control unit server 104 of increases or decreases in energy levels that cross a particular threshold. An energy level that crosses a threshold can indicate an addition or removal of a device from the monitored property 102.

The energy-monitoring device 118 can detect a new appliance that has recently been connected to the electrical load of the monitored property 102. In response to detecting a new appliance, the energy-monitoring device 118 transmits an indication to the control unit server 104 indicating a new appliance has been connected to the electrical load of the monitored property 102. In response, the control unit server 104 dispatches one or more drones to survey the monitored property 102 to detect and identify the newly connected device. The drones can survey the property until detecting the newly connected device. Once the drones detect the newly connected device, the drones can transmit barcode or media data to the control unit server 104 of the newly connected device. The control unit server 104 can also request for the owner 138's assistance in identifying the newly connected device.

In one example, the control unit server 104 can transmit a notification to the client device 138 requesting the owner 136 to capture an image of the newly detected device identified by the energy-monitoring device 118. In another example, the control unit server 104 can transmit a notification to the client device 138 requesting the owner 136 move the drone 144 to the location of the newly detected device identified by the energy-monitoring device 118. In another example, the control unit server 104 can transmit a notification to the client device 138 requesting a location on the generated digital map of the monitored property 102 from the owner 136 of the newly detected device by the energy-monitoring device 118. The owner 136 can respond to each of these examples with the client device 138 in order for the control unit server 104 to register the newly detected device. In particular, the client device 138 or the drone 144 can provide the media data, barcode data, the location of the newly detected device on the digital map, or the make and model information of the newly detected device to the control unit server 104. In addition, the client device 138 or the drone 144 can provide each of the aforementioned data sets or a subset of the aforementioned data to the control unit server 104.

The control unit server 104 can receive the media data, the barcode data, or other information recognizing the newly detected device from the client device 138 or the drone 144. If the control unit server 104 received media or barcode data, the control unit server 104 can use image recognition to determine the make and model of the newly detected device, or the control unit server 104 can use the barcode data to determine the make and model of the newly detected device. In response, the control unit server 104 compares the make and model of the newly detected device to each item in the table of the digital locker database 160 corresponding to the monitored property where the newly detected device was found. If no match is found for the corresponding monitored property 102, then the control unit server 104 determines the newly detected device is in fact a new device because the digital locker database 160 has no recollection or storage of this device. In some examples, the control unit server 104 compares the received media or barcode data to a plurality of media, e.g., images, to determine the likelihood that the received media corresponds to an image from the plurality of media. If the control unit server 104 determines that the received media matches to a particular image, then the control unit server 104 determines that the received media matches to a newly detected item it device.

In response, the control unit server 104 stores the newly detected device in the digital locker database 160 for the corresponding monitored property. In addition, the control unit server 104 transmits a notification to the client device 138 indicating to the owner 136 that a new device has been added to the digital locker database 160. For example, the client device 138 would display a message to the owner 136 that recites "new refrigerator added to the digital locker database." In other examples, the control unit server 104 can receive a notification from the client device 138 indicating that a new device has been added to the monitored property 102, and that the digital locker database 160 needs updating.

The control unit server 104 can also detect unidentified pipes connecting to the monitored property 102's HVAC system. In particular, the control unit server 104 can detect whether the HVAC system is pumping more water than typical daily use over a period of time using water flow sensors on the output and input pipes of a sump pump found in the HVAC system. The control unit server 104 can dispatch one or more drones to survey the monitored property 102 to find the new device that is causing the increase in water flow. For example, a drone may find that the owner 136 has recently installed a new sink on the monitored property 102. In another example, a drone may find that the owner 136 has recently installed a new toilet on the monitored property 102. The control unit server 104 will store items of the newly identified devices causing the water increase in the digital locker database 160 in response to the drone detecting the newly identified device.

In some implementations, the control unit server 104 generates a schedule indicating how often the drones should periodically survey the monitored property 102. The schedule can include surveying once a week, once a month, or once every other month, to name a few examples. The owner 136 can manually generate the schedule for the drones by entering a frequency of drone scheduling for surveying on the smart home application on the client device 138. In another example, the control unit server 104 can automatically determine a schedule based on how often new devices come into a monitored property 102 or other monitored properties. The drones perform the survey on the scheduled basis to detect any additional or new devices that have been added to the monitored property 102. In addition, the drones may detect devices that have been moved around in the monitored property 102.

In some implementations, some devices in a monitored property are designed to be moved around. For example, a vacuum cleaner may move between different rooms and levels in the monitored property 102. However, an oven, such as oven 122, does not move around. Thus, when the drones survey the monitored property, the control unit server 104 notifies the drones of devices that may not be in the same location when they last found those devices. For example, if the drones first find a vacuum cleaner in the basement and later find a vacuum cleaner on the main floor, the drones can indicate to the control unit server 104 that there is a greater likelihood that these two vacuum cleaners are the same. However, if the drones find a device that is typically not moved in a first location, and appear to be in a second location, the drones can return to the first location to see if the device is still at the first location. For example, if the drones first find a refrigerator on the main floor and at a later point in time, find a refrigerator in the attic, the drones can return to the location on the main floor to see if the first refrigerator still exists on the main floor location. A few situations can occur at this point. If the drones do not find a refrigerator on the main floor location, the drone can transmit an indication to the control unit server 104 requesting input from the owner 136. In particular, the indication from the drone can include whether the old refrigerator has been moved. The control unit server 104 can transmit a notification to the client device 138 and request input from the owner 136 regarding the disappearance of the refrigerator on the main floor location. The owner 136 can indicate that the refrigerator has been moved to the attic or can indicate that the refrigerator on the main floor was tossed and the refrigerator in the attic is newly added. Based on the owner 136's response, the control unit server 104 can indicate that the refrigerator is the same or for the drone to capture new media of the refrigerator in the attic. Upon capturing the new media of the refrigerator in the attic, the control unit server 104 can store a new device item along with the new media of the refrigerator and its new location in the digital locker database 160.

Continuing with the refrigerator example, if the drones do find a refrigerator on the main floor location, the drones can determine if the refrigerator on the main floor location matches the refrigerator in the attic. The drones can collectively capture images of both refrigerators on the main floor and the attic. If the drones determine both refrigerators are of the same make and model, then the drones can indicate to the control unit server 104 that monitored property 102 includes two of the same refrigerators. The control unit server 104 can put in a notification in the digital locker database 160 that the same make and model refrigerator is found twice in the monitored property 102.

In some implementations, the control unit server 104 can use the cameras 106, lights 108, sensors 110, devices 112, and one or more microphones to determine whether to instruct one or more drones to perform a survey of the monitored property 102. For example, outdoor video camera 134 can detect that the owner 136 is moving towards the front door 128 with a package. In another example, the outdoor camera 134 can detect a delivery truck arriving at the monitored property 102 that appears to be delivering a package to the monitored property 102. The outdoor video camera 134 can perform object identification to determine that the package is newly identified. The control unit server 134 can use an outdoor motion sensor to indicate a user approaching the front door 128, such as the owner 136 or the truck driver of the delivery truck. As a user enters the front door 128 of the monitored property 102, the control unit server 104 can brighten the luminosity of the lights 108 for an indoor camera to perform additional object identification on the newly identified package.

Additionally, the control unit server 104 can use one or more motion sensors indoors to determine a movement of the user throughout the monitored property 102. In response to the control unit server 104 detecting a newly identified package, the control unit server 104 can subsequently dispatch one or more drones to survey the monitored property 102 to identify the newly identified package. In some implementations, the control unit server 104 seeks to determine when the owner 138 opens the newly identified package. The control unit server 104 can increase the sensitivity of the microphones in the monitored property 102 to listen for when the owner 138 opens the newly identified package. For example, the microphones can listen for rumbled package opening sounds and tape being cut off the package. In other implementations, the control unit server 104 can use an indoor video camera to recognize a situation in which the owner 138 unwraps and opens a package. In response to detecting the owner 138 unwrapping an opening a package with either the indoor video camera or the microphones, the control unit server 104 can dispatch one or more drones to survey the monitored property 102 for the new device.

The control unit server 104 can use the data in the digital locker database 160 to determine whether a recall exists on one or more devices in the monitored property 102. The control unit server 104 can search the Internet or another external database using the serial numbers of the devices in the digital locker database 160 for any recalls. In some implementations, the owner 136 may receive notifications from product groups on his or her client device 138 indicating that one or more devices, such as printer 126 and oven 122, have one or more factory recalls. The notifications can include one or more serial numbers that have the factory recalls. The owner 136 can interact with the smart home application on his or her client device 138 to check whether the serial number found in the digital locker database 160 matches any of the one or more serial numbers found in the notifications provided by the product groups. If a match does exist for a specific device (or multiple devices), the owner 136 can inform the control unit server 104 to put a notification in the digital locker database 160 that the device is being shipped out for factory recall.

Alternatively, the control unit server 104 can poll the Internet or another external database to determine if a factory recall exists on each of the serial numbers found in the digital locker database 160. The control unit server 104 can also contact the product groups themselves to determine if the serial numbers found in the digital locker database 160 have a factory recall. These steps can also be performed by the security-monitoring device, and for the additional monitoring properties. In some implementations, the control unit server 104 can notify the owner 136 through the client device 138 or the display panel 154 that a factory recall exists on one or more of the devices in the monitored property 102. The control unit server 104 can provide more detailed information to the client device 138 in response to the owner 136 requesting information on the smart home application. The additional detailed information can include a type of the recall, a reason for the recall, what part requires fixing, how to deliver the device to the product group to fix, and how long it will take the product group to return the fixed device to the owner 136. After the owner 136 ships the device to the product group and receives the fixed device, the owner 136 can input through the smart home application on the client device 138 that the device has returned. In response to the control unit server 104 receiving an indication from the client device 138 that the device has returned, the control unit server 104 can remove notification from the digital locker database 160 corresponding to the factory recalled device indicating the device was out for recall.

In other implementations, the control unit server 104 can data from the cameras 106, lights 108, and sensors 110 to detect when the factory recalled device has returned before the owner 136 notifies the control unit server 104 of the recalled device's return. The control unit server 104 can use image analysis with media from the outdoor camera 134 to detect a delivery truck approaching the monitored property 102. The control unit server can also use image analysis with media from the outdoor camera 134 to detect a package approaching the front door 128. Motion sensors in the sensors 110 can be used to detect movement throughout the monitored property 102 while video cameras 106 inside the monitored property 102 track movement of the owner 136 carrying the received package using facial recognition. The control unit server 104 may brighten the lights 108 in case the video cameras inside the monitored property 102 have a difficult time identifying what the owner 136 is carrying. The control unit server 104 can use the microphones and the video cameras to recognize when the user opens the received package. Shortly thereafter, the control unit server 104 can dispatch one or more drones to survey the monitored property 102 and identify the newly received device. Once the one or more drones find the device, the drones may transmit either the barcode data or media data to control unit server 104 for further identification. The control unit server 104 can recognize the barcode or media data corresponds to the recalled device that was out. In response to recognizing the barcode or media data as the device that was recalled, the control unit server 104 can transmit a notification to the client device 138 of the owner 136 asking if the new package that was just received was the recalled device. If the owner 136 responds yes, then the control unit server 104 removes the indication from the digital locker database 160 indicating that the device is out for factory recall. If the owner 136 responds no, then the control unit server 104 adds a new entry in the digital locker database 160 of the device with all of its corresponding information from the media and barcode data.

In some implementations, the control unit server 104 can share the digital locker database 160 with various external sources for product services. For example, the control unit server 104 can share portions of data, such as the serial numbers of the devices, with an external service provider to determine whether any devices are outdated. The owner 136 can request recommendations from the control unit server 104 for updates to new products. In addition, if the control unit server 104 recognizes that the monitored property 102 is missing devices typically found in other monitored properties, the control unit server 104 can recommend devices to buy from companies, such as AMAZON, for example. The control unit server 104 can transmit the links for newly recommended devices to the client device 138 of the owner 136. In some implementations, the owner 136 can control the digital locker database 160 and corresponding settings for privacy reasons.

Figure 2:
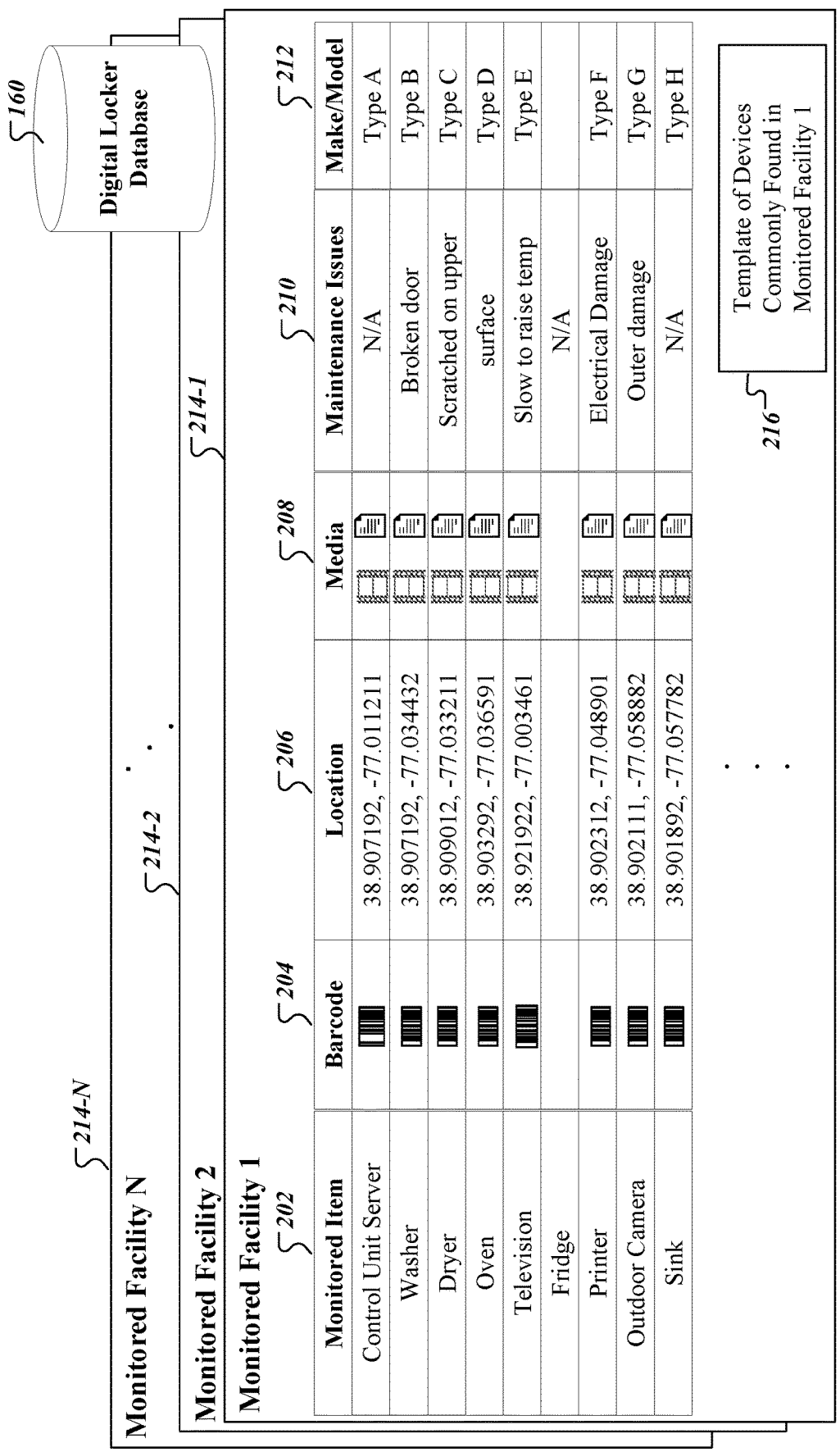
FIG. 2 is a contextual diagram of a digital locker database.

FIG. 2 is contextual diagram of a digital locker database 160. In particular, digital locker database 160 includes a table for each of the properties monitored by the security-monitoring device 156. As illustrated in FIG. 2, the tables in the digital locker database 160 include a table 214-1 for monitored property 1, table 214-2 for monitored property 2, through table 214-N for monitored property N. N can be any number of monitored properties, as monitored by the security-monitoring device 156. Each table in the digital locker database 160 includes a set of objects from the corresponding monitored property. In addition, each table includes a template of devices commonly found in the corresponding monitored property. An illustrative example of the template of devices commonly found in a monitored property, such as monitored property 102, is template of devices 162. As previously mentioned, the template of devices 162 can include a control unit server, a washer, a dryer, an oven, a television, a fridge, a printer and an outdoor camera, to name a few examples.

The number of devices found in the template of devices can differ from the number of devices found in the monitored property 102. In particular, the monitored property 1 includes a column of monitored items 202, barcode information 204, location of the items 206 in the monitored property 1, media 208 of the monitored items, maintenance issues 210 with the monitored items, and the make/model of the monitored item. The monitored items 202 in the monitored property 1 include a control unit server, a washer, a dryer, an oven, a television, a fridge, a printer, an outdoor camera, and a sink. These monitored items 202 are the connected and unconnected items found in the monitored property 214-1. The template of devices 216 are the devices commonly found in the monitored property 214-1.

In some implementations, the barcode information 204 in the table can be stored in various manners. For example, the barcode information 204 can be stored as images, serial numbers converted from the barcode information, or data representing the barcode information. The barcode information 204 corresponds to each item monitored in the monitored property 214-1.

In some implementations, the location information 206 indicates the location of each monitored item in the monitored property. The location information 206 can include a GPS coordinate of each of the monitored items or a description of the monitored items location. In some cases, the location information 206 can include both a GPS and a description of the monitored items location.

In some implementations, the media information 208 indicates the media captured by the drones, the video camera at the monitored property, or the client device 138's camera of the monitored item. For example, the media can include one or more images of the monitored item or one or more video clips of the monitored item.

In some implementations, the maintenance issues 210 can indicate issues with the monitored items. An owner, such as owner 137, can indicate problems with the monitored item by interacting with the client device 138. In some implementations, the maintenance information can include media showing the images or video footage of the damage of the monitored items. For example, the maintenance information shows one or more images of scratches on the surface of the printer.

In some implementations, the make and model information 212 can indicate the make and model of the monitored item. For example, the make and model information 212 for the television is a SAMSUNG Q9FN QLED 4K UHD TV. The control unit server 104 can determine the make and model information for each of the monitored items by searching the Internet or another third party database using the captured media information or the barcode information.

The digital locker database 160 allows for a user, such as owner 136, to manually enter information for each monitored item corresponding to a monitored property. For example, owner 136 can input information in the smart home application on his or her client device 138 to be stored in the digital locker database 160. The owner 136 can enter in a new monitored item for a corresponding monitored property 102. Additionally, the owner 136 can enter information for each new monitored item, such as the barcode information, location information, media information, maintenance issues, and make/model information. The digital locker database 160 can also include information not showed in FIG. 2, such as serial information, address information of the monitored property, owner contact information of the monitored property, and which device provided the information. For example, the digital locker database 160 can indicate that drone 144 identified the sink and drone 132 identified the television. In addition, the digital locker database 160 can indicate that the owner 136 uploaded information regarding the control unit server 104.

FIG. 3 is a flowchart of an example process 300 for cataloging objects at a monitored property using a drone. Generally, the process 300 includes generating a template for items commonly found in a monitored property; providing the template and an indication to perform a survey of the monitored property to a drone; receiving data indicating whether the drone found each item from the template in the monitored property; in response to determining the drone did not find each item from the template in the monitored property, transmitting a request to a client device of the monitored property requesting a location for each missing item from the template; receive the location for each missing item from the template in the monitored property from the client device; and, in response to receiving the location for each missing item, transmitting the location for each missing item to the drone for the drone to find each missing item. Alternatively, the process 300 can be used for determining that the drone did find each item from the template in the monitored property. The process 300 will be described as being performed by a computer system comprising one or more computers, for example, the system 100 as shown in FIG. 1.

During 302, the control unit server 104 generates a template for items commonly found in a monitored property. The control unit server 104 can generate a template based on the type of monitored property. For example, if a monitored property, such as monitored property 102, is a residential home, the control unit server 104 can generate a template of device items typically found in a residential home. This can include a control unit server, a washer and dryer, an oven, a refrigerator, a television, a fridge, a printer, a bed, a car, a lawn mower, and a desk, to name a few examples. In another example, the control unit server 104 recognizes that a monitored property is a commercial property, the control unit server 104 can generate a template of items that are typically found in a commercial property. This can include a control unit server, a printer, a fax machine, one or more computers, office chairs, teleconference system, television, coffee machine, and a key badge scanner, to name a few examples. The control unit server 104 can generate the template list based on generally common items found in that type of monitored property. In some implementations, the control unit server 104 can search the Internet for commonly found items based on the type of monitored property. In other implementations, the control unit server 104 can determine commonly found items in a type of monitored property by determining the most commonly found items in other monitored properties of a similar type. In another example, if the monitored property is an airport terminal, the control unit server 104 can generate a template of items typically found in the airport terminal. This can include a control unit server, a kiosk, luggage, security terminals, and transit systems, to name a few examples.

During 304, the control unit server 104 provides the template and an indication to a drone to perform a survey of the monitored property. The control unit server 104 transmits the generated template list and a notification to power on each of the drones found at a drone-docking station on the monitored property 102 over network 116. In other implementations, the security-monitoring device 156 generates the template and transmits the template list and the notification to power on each of the drones to the drone-docking station. The drone-docking station includes one or more docked drones, such as drone 132 and drone 144, and one or more antenna for receiving communications from the control unit server 104 and the security-monitoring device 156. In addition, the client device 138 can communicate with the drone-docking station. The drone-docking station can determine the number of drones to launch to survey the monitored property with the received template of items. In other implementations, the client device 138, the control unit server 104, and the security-monitoring device 156 can indicate which one or more drones to launch to survey the monitored property 102.

During 306, the control unit server 104 can receive data indicating whether the drone found each item from the template in the monitored property 102. In some implementations, drone 144 can find objects found on the template of items 162 and other objects not found on the template of items 162. For example, drone 144 can detect washer 121 using corresponding barcode 150, dryer 120 using corresponding barcode 152, oven 122 using corresponding barcode 148, television 124 using corresponding barcode 123, and control unit 104 using corresponding barcode 154. In addition, drone 144 can find objects not found on the template of items 162, such as a door 128, a window 130, a chair, a desk, pencil holder, a trashcan, and one or more books, to name a few examples. The drone can indicate items it found on the template of items 162. For example, the drone recognizes it found the oven 122 and places an indication in the template of items 162 that the oven 122 has been found. The drone can send an updated template of items 162 with one or more of the items marked as found to the control unit server 104 each time a new item is found. The drone can also send an updated template of items 162 to the control unit server 104 after the drone finishes surveying the monitored property 102.

In other implementations, the drone can send data to the control unit server 104 of the detected object and the control unit server 104 determines whether the drone found an object listed on the template of items 162. For example, the data can include media or barcode data of the detected object from the drone, a client device 138, or an indoor/outdoor camera at the monitored property 102. The control unit server 104 can use the media or the barcode data to identify the detected object and compare the identified object to each item on the template of items 162. The control unit server 104 can indicate on the template of items 162 which item detected was found. The control unit server 104 will not add the items not found on the template of items 162, but will add the items to the digital locker database 160. Each time the control unit server 104 receives the template of items 162 from the drone, the client device, or the monitored property 102's video cameras, the control unit server 104 determines whether the template of items 162 needs to be marked, and stores the template of items 162 in the digital locker database 160 corresponding to the monitored property.

During 308, in response to the control unit server 104 determining the drone did not find each item from the template in the monitored property, the control unit server transmits a request to a client device of the monitored property requesting a location for each missing item from the template. Once the drone finishes surveying the monitored property 102, the control unit server 104 can determine the number of items found from the template of items 162. For instance, the control unit server 104 can determine from the template of items 162, that each of the items were found except for the refrigerator. In response to determining that the refrigerator was not found, the control unit server 104 can transmit a notification to the client device 138 of the owner 136 indicating that the refrigerator was not found. Additionally, the notification asks the owner 136 if the refrigerator is missing from the monitored property 102. The control unit server 104 can also indicate if the drone missed the refrigerator, requests that the owner 136 provide the location of the missing refrigerator on the client device 138. The notification can be transmitted over the network 116.

During 310, the control unit server 104 can receive the location for each missing item from the template in the monitored property 102 from the client device 138. The owner 136 can provide the location for each missing item from the template in the monitored property 102 using the client device 102. The location of the missing items can be indicated by GPS coordinates, defining a particular room in the monitored property where the missing item is, or a picture of the location in the monitored property 102.

During 312, in response to the control unit server 104 receiving the location for each missing item, the control unit server 104 can transmit the location for each missing item to the drone for the drone to find the missing item. Using the information provided by the owner 136 of the missing items, the control unit server 104 can transmit the information to drones to survey the monitored property 102 to find the missing items. For example, if the control unit server 104 receives GPS coordinates of the missing item, the control unit server 104 can transmit the GPS coordinates to a drone to move to that location and capture media or barcode data of that device. In another example, if the control unit server 104 receives a picture of the location in the monitored property 102 where the missing item is located, the control unit server 104 can transmit the picture to a drone to survey the monitored property 102 and search for a location that matches the picture. In another example, if the control unit server 104 receives a tag that defines the particular room in the monitored property where the missing item is located, the control unit server 104 transmits an indication to the drone to proceed to survey that room to find the missing item.

Figure 4:
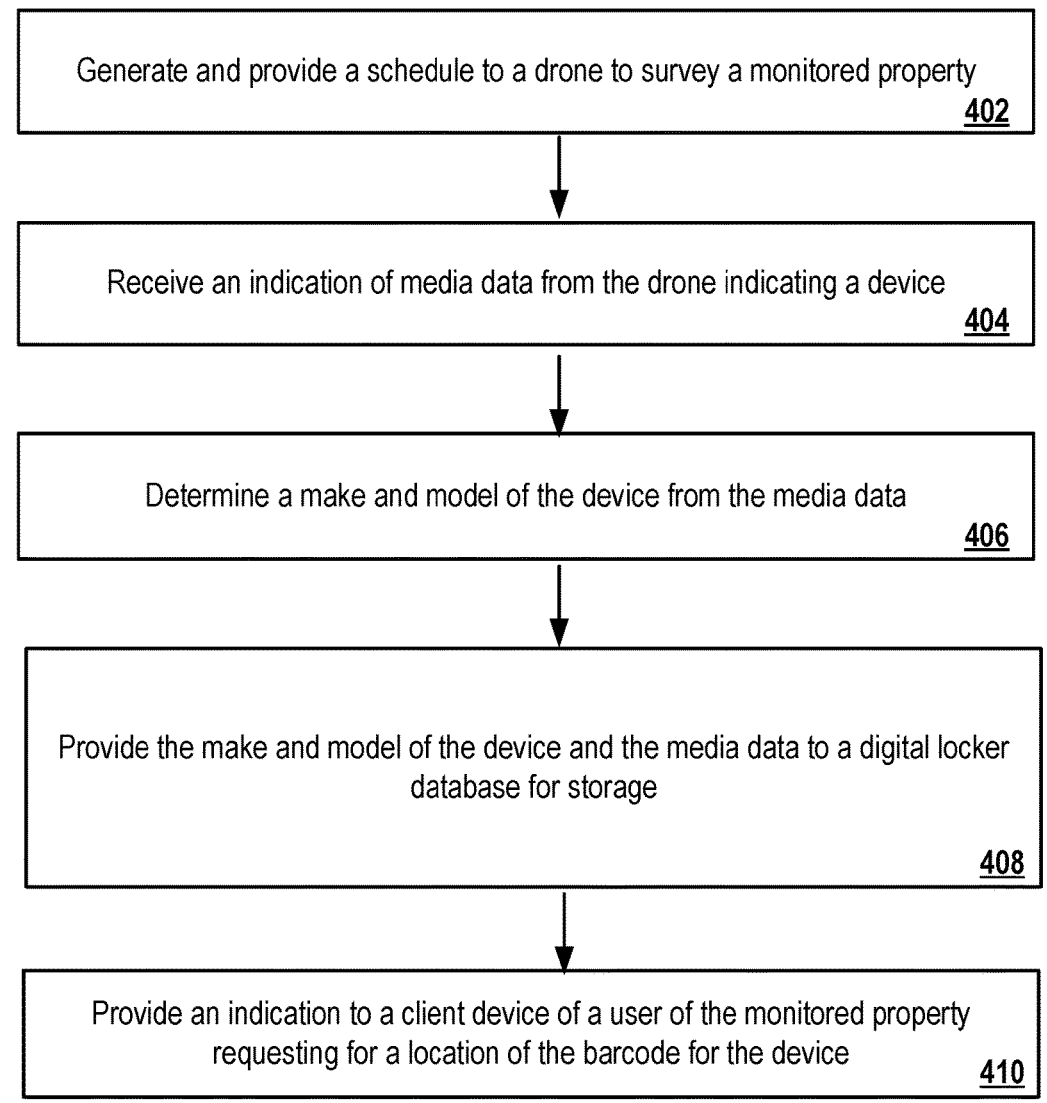

FIG. 4 is a flowchart of another example process 400 for cataloging objects at a monitored property using a drone.

Generally, the process 400 includes providing a schedule to a drone to scan a monitored property for devices; receiving an indication of media data from the drone for a device; determining a make and model of the device from the media data; providing the make and model of the device and the media data to a digital locker database for storage; and, providing an indication to a client device of a user of the monitored property requesting for a location of the barcode for the device. The process 400 will be described as being performed by a computer system comprising one or more computers, for example, the system 100 as shown in FIG. 1.

During 402, the control unit server 104 generates and provides a schedule to a drone to survey a monitored property. The control unit server 104 generates a schedule indicating how often the drones should periodically survey the monitored property 102. The schedule can include surveying the monitored property 102 once a week, once a month, or once every other month, to name a few examples. The owner 136 can manually indicate the schedule on the smart phone application on his or her client device 138. Additionally, the control unit server 104 can automatically determine a schedule based on how often new devices come into a monitored property 102 or other monitored properties.

During 404, the control unit server 104 receives an indication of media data from the drone indicating a device. As the drone surveys the interior and exterior of the monitored property for objects, the drone can transmit captured media of each object or device the drone encounters as it surveys the monitored property 102. The media can include one or more images or one or more videos of the object. For example, as drone 144 flies around the monitored property 102, the drone 144 detects the television 124. If the drone 144 does not detect the barcode 123 on the television 124, the drone 144 can capture media of the television 124 from various angles. The drone 144 can then perform image recognition to determine a make and model of the television 124. Alternatively, the drone 144 can transmit the captured media of the television 124 to the control unit server 104

During 406, the control unit server 104 determines a make and model of the device from the media data. In particular, the control unit server 104 performs the image recognition to determine the make and model of the television 124. The control unit server 104 can use the captured media to search the Internet or another external database to determine the television 124's make and model. For example, the control unit server 104 can determine that television 124's make and model is SAMSUNG Q9FN QLED 4K UHD TV.

During 408, the control unit server 104 provides the make and model of the device and the media data to a digital locker database 160 for storage. Each time the drone detects a new object and sends either media data or barcode data to the control unit server 104, the control unit server 104 transmits information on the detected device to the digital locker database 160. The information includes the detected device, media of the detected device, an indication of the drone that found the device, the monitored property where the device was found, the make and model of the device, a serial number of the device, and a location of the device. The digital locker database 160 stores the information on the detected device under the corresponding monitored property index.

During 410, the control unit server 104 provides an indication to a client device of a user of the monitored property requesting for a location of the barcode for the device. The control unit server 104 can transmit the indication to the client device 138 requesting for the location of the barcode on the detected device over network 116. The indication can include a message or a notification to instruct the client device 138 to generate a message. The owner 136 can respond to the notification with a few responses. In particular, the owner 136 can indicate that the detected device does not have a barcode. In another response, the owner 136 can indicate that the detected device is found on a particular side of the detected device. In another response, the owner 136 can take a picture of the barcode on the detected device and transmit the barcode data to the control unit server 104 over the network 116. In another response, the owner 136 can summon the drone to the location of the detected device; expose the barcode on a portion of the detected device for the drone to capture a picture of the barcode. In response, the drone can transmit the barcode data to the control unit server 104.

Figure 5:
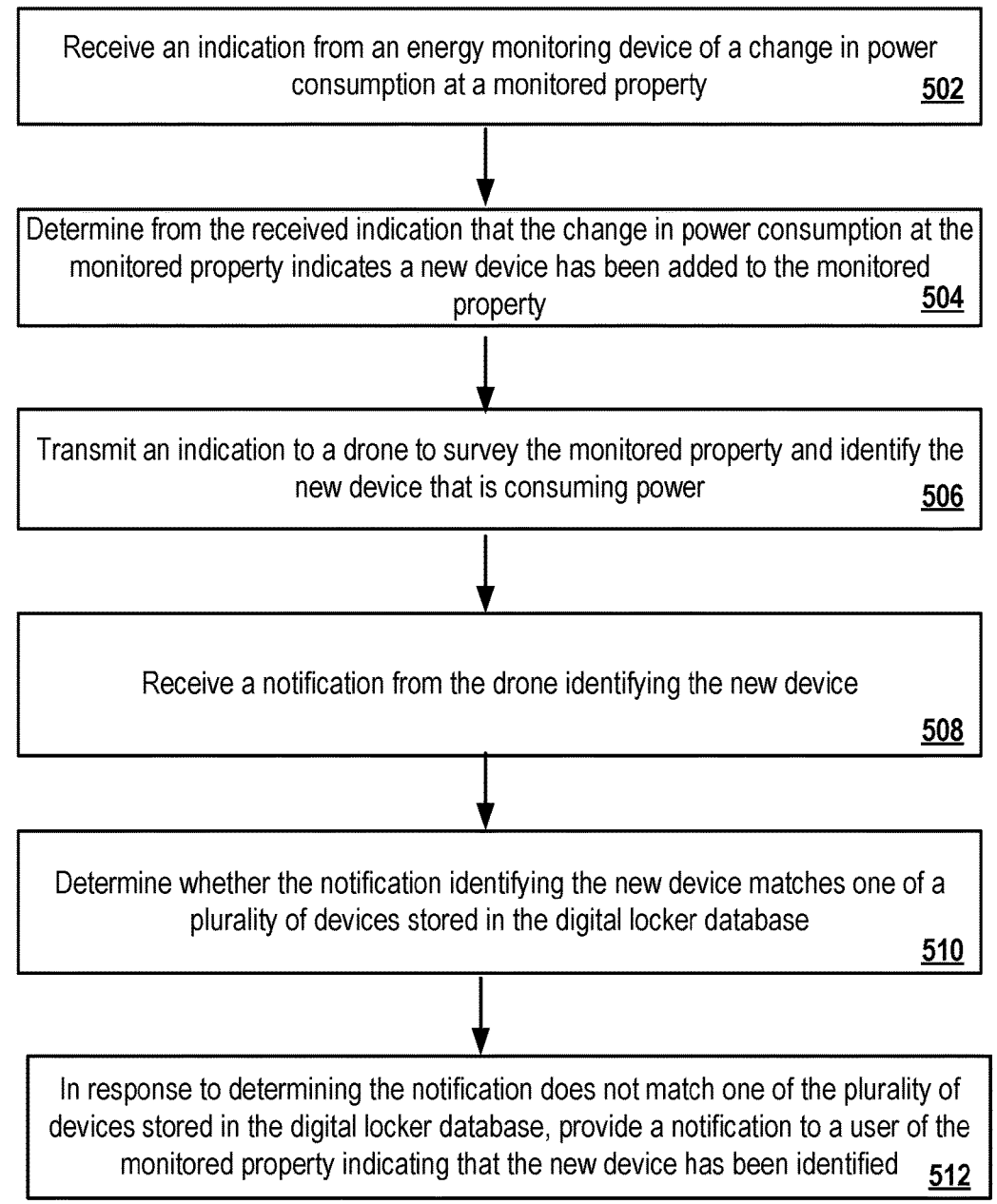

FIG. 5 is a flowchart of another example process 500 for cataloging objects at a monitored property using a drone. Generally, the process 500 includes receiving an indication from an energy-monitoring device of a change in power consumption at a monitored property; determining from the received indication that the change in power consumption at the monitored property indicates a new device has been added to the monitored property; transmitting an indication to a drone to survey the monitored property and identify the new device that is consuming power; receiving a notification from the drone identifying the new device; determining whether the notification identifying the new device matches one of a plurality of devices stored in the digital locker database; in response to determining the notification does not match one of the plurality of devices stored in the digital locker database, providing a notification to a user of the monitored property indicating that the new device has been identified. The process 500 will be described as being performed by a computer system comprising one or more computers, for example, the system 100 as shown in FIG. 1.

During 502, the control unit server 104 receives an indication from an energy-monitoring device of a change in power consumption at a monitored property. The energy-monitoring device 118 can be a device found in the monitored property 102 that is used to provide information or energy or power consumption in the monitored property 102.

Specifically, the energy-monitoring device 118 connects to the electricity meter 119 of the monitored property 102 and provide usage statistics of energy consumption to the client device 138 and to the control unit server 104. Additionally, the energy-monitoring device 118 can indicate the energy usage of individual appliances found in the monitored property 102. The energy-monitoring device 118 can also identify and provide indications to the control unit server 104 of changes in energy levels.

During 504, the control unit server 104 determines from the received indication that the change in power consumption at the monitored property indicates a new device has been added to the monitored property. The control unit server 104 can compare the received energy consumption to one or more thresholds. If the control unit server 104 determines the energy level is greater than or equal to an upper threshold, the control unit server 104 determines that a new appliance has been added to the monitored property. If the control unit server 104 determines the energy level is less than or equal to a lower threshold, the control unit server 104 determines that an appliance has been removed from the monitored property. In other implementations, the energy-monitoring device 118 can indicate to the control unit server 104 that an appliance has been added or removed from the monitored property 102. Additionally, the energy-monitoring device 118 can also indicate a type of the device added or removed. In some implementations, the energy-monitoring device 118 can identify the location of the power consumption change down to the location of the breaker.

During 506, the control unit server 104 transmits an indication to a drone to survey the monitored property and identifies the new device that is consuming power. In response to the control unit server 104 determining that a new device has been added to the monitored property 102, the control unit server 104 dispatches one or more drones to survey the monitored property 102 to detect and identify the newly connected device.

During 508, the control unit server 104 receives a notification from the drone identifying the new device. For example, the control unit server 104 can receive media data, barcode data, the location of the new identified device on the digital map, or the make and model information of the newly detected device from the drone that identified the new device or the client device 138 over network 116.

During 510, the control unit server 104 determines whether the notification identifying the new device matches one of a plurality of devices stored in the digital locker database. Using the make and model of the newly detected device, the control unit server 104 compares the make and model of the newly detected device to each item in the table of the digital locker database 160 corresponding to the monitored property where the newly detected device was found. If the control unit server 104 does not find a match for the corresponding monitored property 102, then the control unit server 104 determines the newly detected device is in fact a new device because the digital locker database 160 has no recollection or storage of this device. If the control unit server 104 finds a match, then the control unit server 104 can ask the owner 136 using client device 138 if the device is a duplicate or is the same device as the matched device.

During 512, in response to the control unit server 104 determining the notification does not match one of the plurality of devices stored in the digital locker database, the control unit server 104 provides a notification to a user of the monitored property indicating that the new device has been identified. In particular, the control unit server 104 stores the newly detected device in the digital locker database 160 for the corresponding monitored property. In addition, the control unit server 104 transmits a notification to the client device 138 indicating to the owner 136 that a new device has been added to the digital locker database 160. For example, the client device 138 would display a message to the owner 136 that recites "new sink added to the digital locker database."

Figure 6:
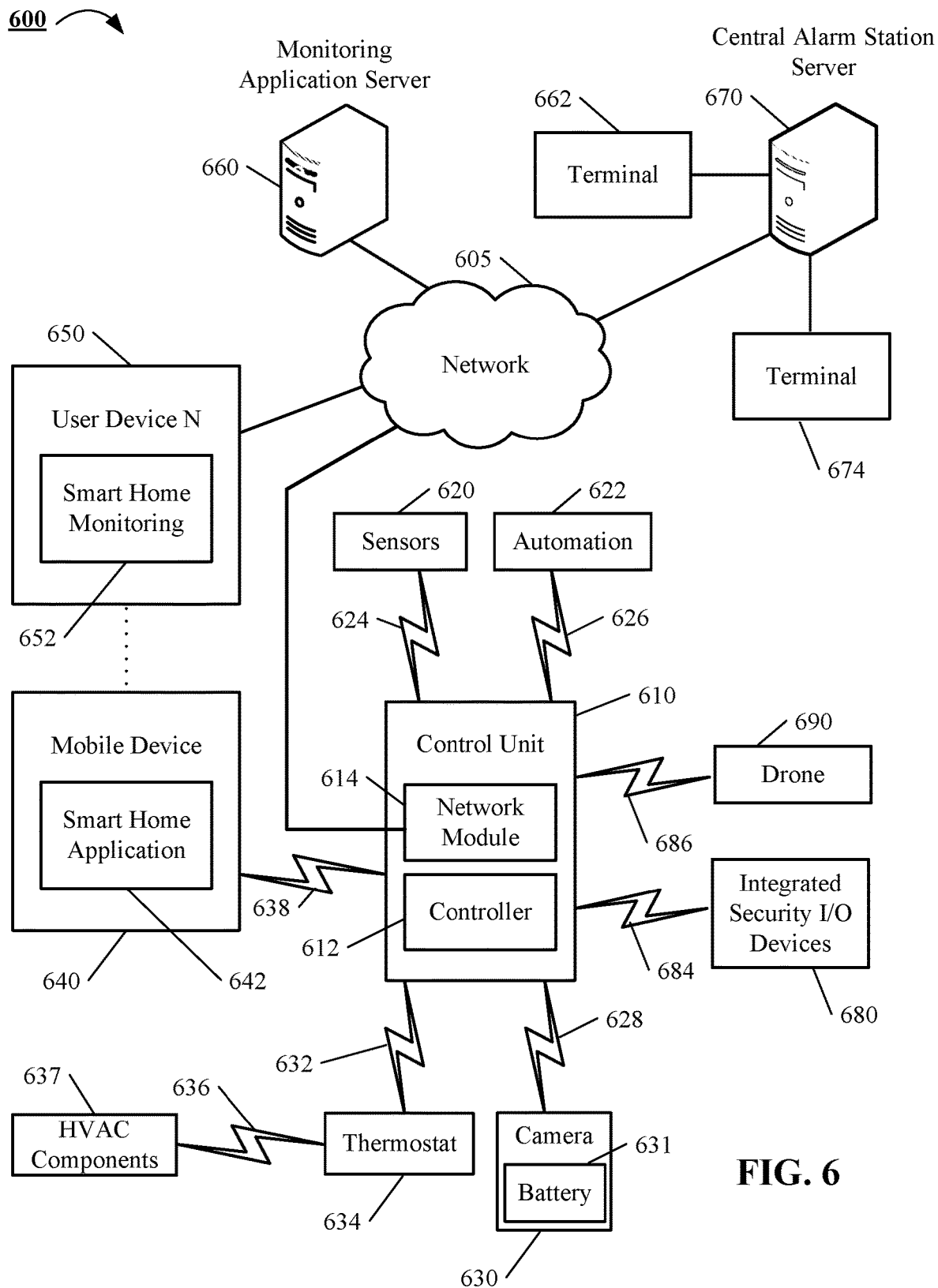
FIG. 6 is block diagram of an example system for cataloging objects at a monitored property that may utilize one or more various components.

FIG. 6 is a block diagram of an example system 600 for cataloging objects at a monitored property that may utilize one or more various components. The electronic system 600 includes a network 605, a control unit 610, one or more user devices 640 and 650, a monitoring application server 660, and a central alarm station server 670. In some examples, the network 605 facilitates communications between the control unit 610, the one or more user devices 640 and 650, the monitoring application server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring application server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voiceband modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 may include a radio-frequency identification (RFID) sensor that identifies a particular article that includes a pre-assigned RFID tag.

The control unit 610 communicates with the module 622 and the camera 630 to perform monitoring. The module 622 is connected to one or more devices that enable home automation control. For instance, the module 622 may be connected to one or more lighting systems and may be configured to control operation of the one or more lighting systems. Also, the module 622 may be connected to one or more electronic locks at the property and may be configured to control operation of the one or more electronic locks (e.g., control Z-Wave locks using wireless communications in the Z-Wave protocol. Further, the module 622 may be connected to one or more appliances at the property and may be configured to control operation of the one or more appliances. The module 622 may include multiple modules that are each specific to the type of device being controlled in an automated manner. The module 622 may control the one or more devices based on commands received from the control unit 610. For instance, the module 622 may cause a lighting system to illuminate an area to provide a better image of the area when captured by a camera 630. The camera 630 can include one or more batteries 631 that require charging. A drone 690 can be used to survey the electronic system 600. In particular, the drone 690 can capture images of each item found in the electronic system 600 and provide images to the control unit 610 for further processing. Alternatively, the drone 690 can process the images to determine an identification of the items found in the electronic system 600.

The camera 630 may be a video/photographic camera or other type of optical sensing device configured to capture images. For instance, the camera 630 may be configured to capture images of an area within a building or within a residential property 102 monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the module 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612 power supply if the camera 630 is co-located with the controller 612.

In some implementations, the camera 630 communicates directly with the monitoring application server 660 over the Internet. In these implementations, image data captured by the camera 630 does not pass through the control unit 610 and the camera 630 receives commands related to operation from the monitoring application server 660.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy-monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634.

A module 637 is connected to one or more components of an HVAC system associated with a property, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy-monitoring information and the state of the HVAC system components to the thermostat 634 and can control the one or more components of the HVAC system based on commands received from the thermostat 634.

In some examples, the system 600 further includes one or more robotic devices. The robotic devices may be any type of robots that are capable of moving and taking actions that assist in security-monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 600 for use in appropriate circumstances. For instance, a robotic vacuum cleaner device may be associated with the monitoring system 600 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 610, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 610. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 600. For instance, after completion of a monitoring operation or upon instruction by the control unit 610, the robotic devices may be configured to automatically fly to and land on one of the charging stations. In this regard, the robotic devices may automatically maintain a fully charged battery in a state in which the robotic devices are ready for use by the monitoring system 600.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices. Additionally, the one or more control units 610 may receive one or more sensor data from the sensors 620 and determine whether to provide an alert to the one or more integrated security input/output devices 680.

The sensors 620, the module 622, the camera 630, the thermostat 634, drone 690, and the integrated security devices 680 communicate with the controller 612 over communication links 624, 626, 628, 632, 684, and 686. The communication links 624, 626, 628, 632, 684, and 686 may be a wired or wireless data pathway configured to transmit signals from the sensors 620, the module 622, the camera 630, the thermostat 634, the drone 690, and the integrated security devices 680 to the controller 612. The sensors 620, the module 622, the camera 630, the thermostat 634, the drone 690, and the integrated security devices 680 may continuously transmit sensed values to the controller 612, periodically transmit sensed values to the controller 612, or transmit sensed values to the controller 612 in response to a change in a sensed value. In some implementations, the drone 690 can communicate with the monitoring application server 660 over network 605. The drone 690 can connect and communicate with the monitoring application server 660 using a Wi-Fi or a cellular connection.

The communication links 624, 626, 628, 632, 684, and 686 may include a local network. The sensors 620, the module 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 660 is an electronic device configured to provide monitoring services by exchanging electronic communications with the control unit 610, the one or more user devices 640 and 650, and the central alarm station server 670 over the network 605. For example, the monitoring application server 660 may be configured to monitor events (e.g., alarm events) generated by the control unit 610. In this example, the monitoring application server 660 may exchange electronic communications with the network module 614 included in the control unit 610 to receive information regarding events (e.g., alerts) detected by the control unit server 104a. The monitoring application server 660 also may receive information regarding events (e.g., alerts) from the one or more user devices 640 and 650.

In some examples, the monitoring application server 660 may route alert data received from the network module 614 or the one or more user devices 640 and 650 to the central alarm station server 670. For example, the monitoring application server 660 may transmit the alert data to the central alarm station server 670 over the network 605.

The monitoring application server 660 may store sensor and image data received from the monitoring system and perform analysis of sensor and image data received from the monitoring system. Based on the analysis, the monitoring application server 660 may communicate with and control aspects of the control unit 610 or the one or more user devices 640 and 650.

The central alarm station server 670 is an electronic device configured to provide alarm monitoring service by exchanging communications with the control unit 610, the one or more mobile devices 640 and 650, and the monitoring application server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more mobile devices 640 and 650 and/or the monitoring application server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and

674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more user devices 640 and 650 are devices that host and display user interfaces. For instance, the user device 640 is a mobile device that hosts one or more native applications (e.g., the smart home application 642). The user device 640 may be a cellular phone or a non-cellular locally networked device with a display. The user device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a smart home application 642. The smart home application 642 refers to a software/firmware program running on the corresponding mobile device that enables the user interface and features described throughout. The user device 640 may load or install the smart home application 642 based on data received over a network or data received from local media. The smart home application 642 runs on mobile devices platforms, such as iPhone, iPod touch, Blackberry, Google Android, Windows Mobile, etc. The smart home application 642 enables the user device 640 to receive and process image and sensor data from the monitoring system.

The user device 650 may be a general-purpose computer (e.g., a desktop personal computer, a workstation, or a laptop computer) that is configured to communicate with the monitoring application server 660 and/or the control unit 610 over the network 605. The user device 650 may be configured to display a smart home user interface 652 that is generated by the user device 650 or generated by the monitoring application server 660. For example, the user device 650 may be configured to display a user interface (e.g., a web page) provided by the monitoring application server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Zwave, Zigbee, HomePlug (ethernet over powerline), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring application server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring application server 660 may relay data received from the control unit 610 to the one or more user devices 640 and 650 through the network 605. In this regard, the monitoring application server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring application server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring application server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 only includes the one or more user devices 640 and 650, the sensors 620, the module 622, the camera 630, and the robotic devices. The one or more user devices 640 and 650 receive data directly from the sensors 620, the module 622, the camera 630, and the robotic devices and sends data directly to the sensors 620, the module 622, the camera 630, and the robotic devices. The one or more user devices 640, 650 provide the appropriate interfaces/processing to provide visual surveillance and reporting.

In other implementations, the system 600 further includes network 605 and the sensors 620, the module 622, the camera 630, the thermostat 634, and the robotic devices are configured to communicate sensor and image data to the one or more user devices 640 and 650 over network 605 (e.g., the Internet, cellular network, etc.). In yet another implementation, the sensors 620, the module 622, the camera 630, the thermostat 634, and the robotic devices (or a component, such as a bridge/router) are intelligent enough to change the communication pathway from a direct local pathway when the one or more user devices 640 and 650 are in close physical proximity to the sensors 620, the module 622, the camera 630, the thermostat 634, and the robotic devices to a pathway over network 605 when the one or more user devices 640 and 650 are farther from the sensors 620, the module 622, the camera 630, the thermostat 634, and the robotic devices. In some examples, the system leverages GPS information from the one or more user devices 640 and 650 to determine whether the one or more user devices 640 and 650 are close enough to the sensors 620, the module 622, the camera 630, the thermostat 634, and the robotic devices to use the direct local pathway or whether the one or more user devices 640 and 650 are far enough from the sensors 620, the module 622, the camera 630, the thermostat 634, and the robotic devices that the pathway over network 605 is required. In other examples, the system leverages status communications (e.g., pinging) between the one or more user devices 640 and 650 and the sensors 620, the module 622, the camera 630, the thermostat 634, and the robotic devices to determine whether communication using the direct local pathway is possible. If communication using the direct local pathway is possible, the one or more user devices 640 and 650 communicate with the sensors 620, the module 622, the camera 630, the thermostat 634, and the robotic devices using the direct local pathway. If communication using the direct local pathway is not possible, the one or more user devices 640 and 650 communicate with the sensors 620, the module 622, the camera 630, the thermostat 634, and the robotic devices using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 uses several techniques to reduce costs while providing access to significant levels of useful visual information.

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "Away" state, but set not to capture images when the alarm system is armed in a "Stay" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a drone that is configured to navigate the property and generate image data;
   a monitor control unit that is configured to:
   access data identifying items;
   provide, to the drone, instructions to navigate the property and locate the items;
   receive, from the drone, (i) data identifying a location of a portion of the items, (ii) first image data associated with each item in the portion of the items, and (iii) data indicating that a remaining portion of the items were not located;
   in response to receiving the data indicating that a remaining portion of the items were not located, transmit, to a client device of a resident of the property, data identifying the remaining portion of the items and data indicating that the drone did not locate the remaining portion of the items;

receive, from the client device of the resident of the property, (i) data indicating a location within the property of a first group of the remaining portion of the items and (ii) data indicating that a second group of the of the remaining portion of the items are not located within the property;

transmit, to the drone, the data indicating the location within the property of the first group of the remaining portion of the items;

receive, from the drone, second image data associated with each location of each item in the first group of the remaining portion of the items; and store (i) the data identifying the location of the portion of the items, (ii) the first image data associated with each item in the portion of the items, (iii) the data indicating the location within the property of the first group of the remaining portion of the items, (iv) the second image data associated with each location of each item in the first group of the remaining portion of the items, and (v) the data indicating that a second group of the of the remaining portion of the items are not located within the property.

2. The system of claim 1, wherein the monitor control unit is configured to:
   determine a property type of the property; and
   based on the property type, identify the items, wherein each property type is associated with groups of items that are likely to be located in the respective property type.

3. The system of claim 1, wherein the monitor control unit is configured to:
   provide, to the drone, the instructions to navigate the property and locate the items by providing, to the drone, the instructions to navigate the property, locate the items, and locate additional items that are not included in the items;
   receive, from the drone, data identifying a location of an additional item and third image data associated with the additional item; and
   store the identifying a location of an additional item and third image data associated with the additional item.

4. The system of claim 1, wherein the drone is configured to:
   analyze the first image data;
   based on analyzing the first image data, determine that the first image data includes a representation of a barcode; and
   determine that the barcode corresponds to an item of the portion of the items.

5. The system of claim 1, wherein the drone is configured to:
   compare the first image data to a plurality of images; and
   based on comparing the first image data to a plurality of images, determine that the first image data includes a representation of an item of the portion of the items.

6. The system of claim 1, wherein the monitor control unit is configured to:
   based on a layout of the property and characteristics of the items, generate a path for the drone to navigate; and
   provide, to the drone, the instructions to navigate the property and locate the items by providing, to the drone, the instructions to navigate the property along the path and location the items.

7. The system of claim 1, wherein the monitor control unit is configured to:
   provide, to the drone, (i) additional instructions to navigate the property to locate the portion of the items and (ii) the data identifying the location of the portion of the items;
   receive, from the drone, data indicating that an item of the portion of items is not in a location of the item; and
   provide, for output to the client device, an alert indicating that the item is not in the location of the item.

8. The system of claim 1, wherein:
   the monitor control unit is configured to:
      provide, to the drone, (i) additional instructions to navigate the property to locate the portion of the items and (ii) the data identifying the location of the portion of the items,
   the drone is configured to:
      determine that an item of the portion of the items is not in a location of the item;
      determine that the item is in a different location of the property; and
      provide, to the monitor control unit, data indicating that the item is located in the different location, and
   the monitor control unit is configured to:
      store data indicating that the item is located in the different location.

9. The system of claim 1, wherein the remaining portion of the items includes only the first group and the second group.

10. The system of claim 1, wherein the monitor control unit is configured to:
    receive data indicating that a new item is located at the property; and
    in response to receiving the data indicating the new is located at the property, provide, to the drone, instructions to navigate the property and locate the new device.

11. The system of claim 1, comprising:
    a sensor that is configured to generate sensor data that reflects an attribute of the property,
    wherein the drone is configured to:
       receive the sensor data;
       analyze the image data and the sensor data; and
       based on analyzing the image data and the sensor data, determine that the image data includes a representation of an item of the portion of the items.

12. A computer-implemented method, comprising:
    accessing, by the monitoring system, data identifying items;
    providing, by the monitoring system and to a drone that is configured to navigate the property and generate image data, instructions to navigate the property and locate the items;
    receiving, by the monitoring system and from the drone, (i) data identifying a location of a portion of the items, (ii) first image data associated with each item in the portion of the items, and (iii) data indicating that a remaining portion of the items were not located;
    in response to receiving the data indicating that a remaining portion of the items were not located, transmitting, by the monitoring system and to a client device of a resident of the property, data identifying the remaining portion of the items and data indicating that the drone did not locate the remaining portion of the items;
    receiving, by the monitoring system and from the client device of the resident of the property, (i) data indicating a location within the property of a first group of the remaining portion of the items and (ii) data indicating that a second group of the of the remaining portion of the items are not located within the property;

transmitting, by the monitoring system and to the drone, the data indicating the location within the property of the first group of the remaining portion of the items;

receiving, by the monitoring system and from the drone, second image data associated with each location of each item in the first group of the remaining portion of the items; and storing, by the monitoring system, (i) the data identifying the location of the portion of the items, (ii) the first image data associated with each item in the portion of the items, (iii) the data indicating the location within the property of the first group of the remaining portion of the items, (iv) the second image data associated with each location of each item in the first group of the remaining portion of the items, and (v) the data indicating that a second group of the of the remaining portion of the items are not located within the property.

13. The method of claim 11, comprising:

determining, by the monitoring system, a property type of the property; and based on the property type, identifying, by the monitoring system, the items, wherein each property type is associated with groups of items that are likely to be located in the respective property type.

14. The method of claim 11, comprising:

providing, by the monitoring system and to the drone, the instructions to navigate the property and locate the items by providing, to the drone, the instructions to navigate the property, locate the items, and locate additional items that are not included in the items;

receiving, by the monitoring system and from the drone, data identifying a location of an additional item and third image data associated with the additional item; and storing, by the monitoring system, the identifying a location of an additional item and third image data associated with the additional item.

15. The method of claim 11, comprising:

analyzing, by the monitoring system, the first image data;

based on analyzing the first image data, determining, by the monitoring system, that the first image data includes a representation of a barcode; and determining, by the monitoring system, that the barcode corresponds to an item of the portion of the items.

16. The method of claim 11, comprising:

comparing, by the monitoring system, the first image data to a plurality of images; and based on comparing the first image data to a plurality of images, determining, by the monitoring system, that the first image data includes a representation of an item of the portion of the items.

17. The method of claim 11, comprising:

based on a layout of the property and characteristics of the items, generating, by the monitoring system, a path for the drone to navigate; and providing, by the monitoring system and to the drone, the instructions to navigate the property and locate the items by providing, to the drone, the instructions to navigate the property along the path and location the items.

18. The method of claim 11, comprising:

providing, by the monitoring system and to the drone, (i) additional instructions to navigate the property to locate the portion of the items and (ii) the data identifying the location of the portion of the items;

receiving, by the monitoring system and from the drone, data indicating that an item of the portion of items is not in a location of the item; and providing, by the monitoring system for output to the client device, an alert indicating that the item is not in the location of the item.

19. The method of claim 11, comprising:

receiving, by the monitoring system, data indicating that a new item is located at the property; and in response to receiving the data indicating the new is located at the property, providing, by the monitoring system and to the drone, instructions to navigate the property and locate the new device.

20. The method of claim 11, wherein the remaining portion of the items includes only the first group and the second group.

* * * * *

UNITED STATES PATENT AND TRADEMARK OFFICE
CERTIFICATE OF CORRECTION

PATENT NO. : 10,741,087 B1
APPLICATION NO. : 16/539446
DATED : August 11, 2020
INVENTOR(S) : Picardi et al.

Page 1 of 1

It is certified that error appears in the above-identified patent and that said Letters Patent is hereby corrected as shown below:

In the Claims

In Claim 1, Column 39, Line 5, delete "of the of the" and insert -- of the --, therefor.

In Claim 1, Column 39, Line 22, delete "of the of the" and insert -- of the --, therefor.

In Claim 6, Column 39, Line 65, delete "location the items" and insert -- location of the items --, therefor.

In Claim 10, Column 40, Lines 33-34, delete "data indicating the new is located" and insert -- data indicating the new item is located --, therefor.

In Claim 12, Column 41, Line 1, delete "of the of the" and insert -- of the --, therefor.

In Claim 12, Column 41, Line 19 (approx.), delete "of the of the" and insert -- of the --, therefor.

In Claim 17, Column 42, Lines 19-20, delete "location the items" and insert -- location of the items --, therefor.

In Claim 19, Column 42, Lines 35-36, delete "data indicating the new is located" and insert -- data indicating the new item is located --, therefor.

Signed and Sealed this
Thirteenth Day of October, 2020

Andrei Iancu
*Director of the United States Patent and Trademark Office*